(12) United States Patent
Yu et al.

(10) Patent No.: US 12,224,707 B2
(45) Date of Patent: Feb. 11, 2025

(54) PHOTOVOLTAIC SYSTEM AND MAXIMUM INPUT POWER DETERMINING METHOD

(71) Applicant: Huawei Digital Power Technologies Co., Ltd., Guangdong (CN)

(72) Inventors: Xinyu Yu, Shanghai (CN); Kai Xin, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 36 days.

(21) Appl. No.: 18/338,573

(22) Filed: Jun. 21, 2023

(65) Prior Publication Data

US 2023/0336121 A1 Oct. 19, 2023

Related U.S. Application Data

(63) Continuation of application No. PCT/CN2020/138578, filed on Dec. 23, 2020.

(51) Int. Cl.
*H02J 3/38* (2006.01)
*H02S 40/32* (2014.01)
*H02S 50/00* (2014.01)

(52) U.S. Cl.
CPC .............. *H02S 50/00* (2013.01); *H02J 3/381* (2013.01); *H02S 40/32* (2014.12); *H02J 2300/26* (2020.01)

(58) Field of Classification Search
CPC .......... H02S 50/00; H02S 40/32; H02S 50/10; H02J 3/381; H02J 2300/26; Y02E 10/56
USPC .......................................................... 307/82
See application file for complete search history.

(56) References Cited

U.S. PATENT DOCUMENTS

| 2012/0242152 | A1  | 9/2012 | Escobar et al. |                |
|--------------|-----|--------|----------------|----------------|
| 2021/0036520 | A1* | 2/2021 | Yu             | ...... H02J 3/381 |
| 2022/0115873 | A1* | 4/2022 | Yu             | ...... H02M 1/007 |

FOREIGN PATENT DOCUMENTS

| CN | 103744469 A | 4/2014 |
|----|-------------|--------|
| CN | 109802426 A | 5/2019 |
| CN | 111162734 A | 5/2020 |

OTHER PUBLICATIONS

Yang, Yongheng, et al., "Delta Power Control Strategy for Multi-String Grid-Connected PV Inverters", Aalborg Universitet, Proceedings of the 8th Annual IEEE Energy Conversion Congress and Exposition, ECCE 2016, total 8 pages.

* cited by examiner

*Primary Examiner* — Rexford N Barnie
*Assistant Examiner* — Swarna N Chowdhuri

(57) ABSTRACT

An input end of each DC-DC conversion circuit in the photovoltaic system is connected to a corresponding photovoltaic string. Output ends of a plurality of DC-DC conversion circuits are connected in parallel to an input end of a DC-AC conversion circuit. A controller performs a partial IV curve scan on each of the DC-DC conversion circuits, and in a scanning process, controls a total input power of the plurality of DC-DC conversion circuits to be consistent with that existing before the scan; and obtains a sum of the maximum input powers of all the DC-DC conversion circuits based on the maximum input power of each of the DC-DC conversion circuits, where a scanned voltage of the partial IV curve scan is less than an open-circuit voltage. The partial IV curve improves scanning efficiency and obtains a maximum input power in a power-limited state, facilitating subsequent power dispatch and control.

18 Claims, 8 Drawing Sheets

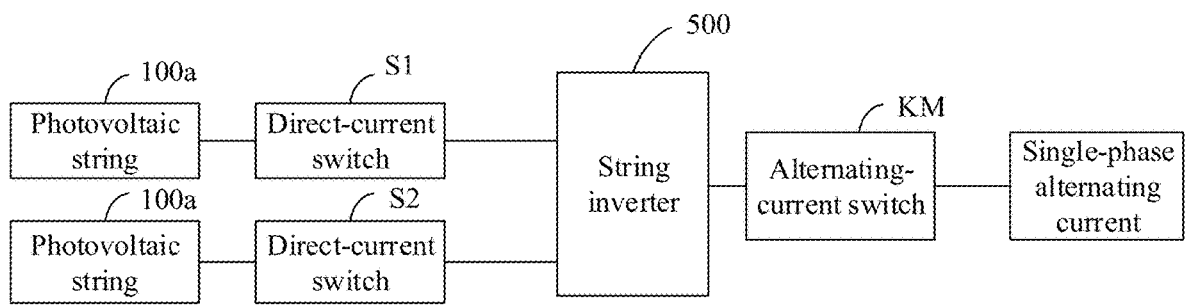

FIG. 7

```
┌─────────────────────────────────────────────────────────────┐
│ Perform a partial current-voltage IV curve scan on each of  │
│ a plurality of DC-DC conversion circuits, and in a process  │
│ of the partial IV curve scan, control a total input power   │ ─── S701
│ of the DC-DC conversion circuits to be consistent with that │
│ existing before the partial IV curve scan, to obtain a      │
│ maximum input power of each of the DC-DC conversion circuits│
└─────────────────────────────────────────────────────────────┘
                              │
                              ▼
┌─────────────────────────────────────────────────────────────┐
│ Obtain a sum of the maximum input powers of all the DC-DC   │
│ conversion circuits based on the maximum input power of     │ ─── S702
│ each of the DC-DC conversion circuits                       │
└─────────────────────────────────────────────────────────────┘
```

FIG. 8

PHOTOVOLTAIC SYSTEM AND MAXIMUM INPUT POWER DETERMINING METHOD

CROSS-REFERENCE TO RELATED APPLICATIONS

This application is a continuation of International Application No. PCT/CN2020/138578, filed on Dec. 23, 2020, the disclosure of which is hereby incorporated by reference in its entirety.

TECHNICAL FIELD

This application relates to the field of photovoltaic power generation technologies, and in particular, to a photovoltaic system and a maximum input power determining method.

BACKGROUND

At present, many photovoltaic stations include a plurality of photovoltaic arrays, and each photovoltaic array includes a plurality of photovoltaic string groups. The photovoltaic station requires the photovoltaic array not to operate at a maximum power point in some cases but provide a power-limited output, to be specific, an inverter in the photovoltaic array needs to control an output power of the photovoltaic string group based on a power limit value in a power limit instruction, rather than that the photovoltaic string group outputs a maximum power without control. Under power limit control, an output power of the photovoltaic string group is less than the maximum power that the photovoltaic string group can output.

However, in practical operation, a maximum input power of the photovoltaic array needs to be predicted in a case with a limited power, to be specific, a maximum input power of each inverter in the photovoltaic array needs to be predicted.

SUMMARY

This application provides a photovoltaic system and a maximum input power determining method, to obtain a maximum input power of an inverter during power-limited operation.

A photovoltaic system according to an embodiment of this application includes: a controller, a Direct Current-Alternating Current (DC-AC) conversion circuit, and a plurality of Direct Current-Direct Current (DC-DC) conversion circuits, an input end of each of the DC-DC conversion circuits is configured to connect to a corresponding photovoltaic string, and output ends of the plurality of DC-DC conversion circuits are connected in parallel and connected to an input end of the DC-AC conversion circuit. Because the plurality of DC-DC conversion circuits are included, to obtain a maximum input power, it is required to obtain a sum of input powers of all the DC-DC conversion circuits. The controller performs a partial Current-Voltage (IV) curve scan on each of the DC-DC conversion circuits, and in a process of the partial IV curve scan, maintains the total input power to be consistent with that existing before the partial IV curve scan, to obtain a maximum input power of each of the DC-DC conversion circuits; and obtains a sum of the maximum input powers of all the DC-DC conversion circuits based on the maximum input power of each of the DC-DC conversion circuits, where a scanned voltage of the partial IV curve scan is less than an open-circuit voltage, that is, instead of a scan from a short-circuit voltage to an open-circuit voltage, the partial IV curve scan is performed to reduce a scanning time and improve scanning efficiency.

In this solution, to prevent impact on operation of an inverter in a power-limited state during obtaining of a maximum input power of the inverter, the controller controls a total input power of the inverter to remain unchanged when the partial IV curve scan is performed. When an input power of a DC-DC conversion circuit on which the partial IV curve scan is performed changes, an input power of a DC-DC conversion circuit on which the partial IV curve scan is not performed is controlled to change accordingly, so that the sum of the input powers of all the DC-DC conversion circuits remains unchanged. Therefore, an IV curve scan performed to obtain a maximum input power in a power-limited state is a partial scan but not a global scan, in other words, is not a conventional IV curve scan, which is a scan from a maximum voltage to a minimum voltage. However, in this embodiment of this application, to improve scanning efficiency, only the partial IV curve scan is performed, provided that a maximum power point is covered in the scan process, and a maximum input power of a photovoltaic station operating in a power-limited state can be obtained through the partial IV curve scan, to facilitate subsequent power dispatch and control. The technical solution provided in this embodiment of this application is to perform the IV curve scan on each DC-DC conversion circuit in the photovoltaic system, thereby avoiding a power estimation error caused by shading or failure of an individual photovoltaic string. In this way, a maximum input power of the system may be obtained more accurately.

This application does not limit a specific quantity of circuits in the scan. For example, the scan may be performed on the circuits in turn, or the circuits may be divided into groups first, where each group may include a plurality of DC-DC conversion circuits, and then the scan is performed on the groups in turn. The two cases are separately described.

In a possible implementation, at least two circuits are used as an example to describe the case of performing the partial IV curve scan on the circuits in turn. For example, the at least two circuits include a first DC-DC conversion circuit and a second DC-DC conversion circuit. The input end of the first DC-DC conversion circuit is connected to the corresponding photovoltaic string, the input end of the second DC-DC conversion circuit is connected to the corresponding photovoltaic string, and the output end of the first DC-DC conversion circuit and the output end of the second DC-DC conversion circuit are connected in parallel and connected to the input end of the DC-AC conversion circuit. The controller is configured to: control an input voltage of the first DC-DC conversion circuit to change, to perform the partial IV curve scan to obtain a first maximum input power of the first DC-DC conversion circuit; in a process of performing the partial IV curve scan on the first DC-DC conversion circuit, adjust an input power of the second DC-DC conversion circuit, so that a sum of an input power of the first DC-DC conversion circuit and the input power of the second DC-DC conversion circuit is consistent with that existing before the partial IV curve scan; by analogy, obtain a second maximum input power of the second DC-DC conversion circuit; and obtain the sum of the maximum input powers of all the DC-DC conversion circuits based on the first maximum input power and the second maximum input power.

In a possible implementation, the controller obtains the first maximum input power of the first DC-DC conversion circuit based on the scanned voltage and a scanned current.

In the scan process, powers of a plurality of sampling points are obtained, and a maximum input power is selected from the powers.

In a possible implementation, to obtain the maximum input power, it is required to record a scanned voltage and a scanned current of each sampling point in the scan process, and obtain a corresponding power based on a product of the scanned voltage and the scanned current. The controller controls the input voltage of the first DC-DC conversion circuit to gradually decrease to perform the partial IV curve scan; records the scanned voltage and a scanned current of the first DC-DC conversion circuit in the process of the partial IV curve scan; and stops scanning when the input power of the first DC-DC conversion circuit decreases and the scanned voltage is less than a voltage existing before the partial IV curve scan. The foregoing description is a condition for stopping the partial IV curve scan, to ensure that the scan process covers the maximum input power, to avoid incomplete scanning and omission of a maximum input power point.

In a possible implementation, in another specific scan manner provided below, a criterion for stopping the scan is different from that described above, where the controller controls the input voltage of the first DC-DC conversion circuit to gradually decrease to perform the partial IV curve scan; records the scanned voltage and a scanned current of the first DC-DC conversion circuit in the process of the partial IV curve scan; and stops scanning when the input power of the first DC-DC conversion circuit is equal to an input power existing before the partial IV curve scan and the scanned voltage is less than a voltage existing before the partial IV curve scan.

In a possible implementation, a starting point of the partial IV curve scan is described below. The controller controls the input voltage of the first DC-DC conversion circuit to gradually decrease from a first voltage to perform the partial IV curve scan, where the first voltage is an input voltage, of the first DC-DC conversion circuit, corresponding to the maximum input power of the second DC-DC conversion circuit when the total input power of the plurality of DC-DC conversion circuits is consistent with that existing before the partial IV curve scan. The solution provided in this embodiment of this application is to control an output voltage of a photovoltaic string to increase from a current operating point E, until the input power of another DC-DC conversion circuit can no longer be increased, in other words, the input power of the another DC-DC conversion circuit restricts an input voltage of a scanned DC-DC conversion circuit from continuing to increase. Then, the maximum voltage is used as a starting voltage for the partial IV curve scan, and the partial IV curve scan is performed from the starting voltage to the left, in other words, with the voltage gradually decreasing.

In a possible implementation, a manner of keeping a total input power unchanged is described below. The controller adjusts the input power of the second DC-DC conversion circuit in the process of the IV curve scan based on the input power of the first DC-DC conversion circuit, so that the sum of the input power of the first DC-DC conversion circuit and the input power of the second DC-DC conversion circuit is a power limit instruction value of the photovoltaic system. Usually, when the photovoltaic system operates at a limited power, operation of a DC-DC conversion circuit is controlled based on a power limit instruction value. The power limit instruction value may be delivered by a dispatch center corresponding to the photovoltaic station, or may be set by the photovoltaic system. This is not limited in this embodiment of this application.

In a possible implementation, the following describes a process of dividing the circuits into a plurality of groups and then performing the partial IV curve scan on the groups in turn. The plurality of DC-DC conversion circuits include N circuits in total, and the N DC-DC conversion circuits are divided into at least the following two groups: a first group including K circuits and a second group including N-K circuits, where K is an integer greater than or equal to 2. The controller is configured to: separately perform the partial IV curve scan on the K DC-DC conversion circuits in the first group; in the process of the partial IV curve scan, control a total input power of the N DC-DC conversion circuits to be consistent with that existing before the partial IV curve scan; obtain the maximum input power of each of the K DC-DC conversion circuits; by analogy, obtain the maximum input power of each of the N-K DC-DC conversion circuits; and obtain the sum of the maximum input powers of the N DC-DC conversion circuits based on the maximum input power of each of the DC-DC conversion circuits.

In a possible implementation, the controller controls the input voltage of each of the K DC-DC conversion circuits to gradually decrease to perform the partial IV curve scan; records the scanned voltage and a scanned current of each of the K DC-DC conversion circuits; and stops scanning when the input power of each of the K DC-DC conversion circuits decreases and the scanned voltage is less than a voltage existing before the partial IV curve scan. The foregoing description is a condition for stopping the partial IV curve scan, to ensure that the scan process covers the maximum input power, to avoid incomplete scanning and omission of a maximum input power point.

In a possible implementation, in another specific scan manner provided below, a criterion for stopping the scan is different from that described above, where the controller controls the input voltage of each of the K DC-DC conversion circuits to gradually decrease to perform the partial IV curve scan; records the scanned voltage and a scanned current of each of the K DC-DC conversion circuits; and stops scanning when the input power of each of the K DC-DC conversion circuits is equal to an input power existing before the partial IV curve scan and the scanned voltage is less than a voltage existing before the partial IV curve scan.

In a possible implementation, the controller obtains the maximum input power of each of the K DC-DC conversion circuits based on the scanned voltage and the scanned current of each of the K DC-DC conversion circuits. In the scan process, scanned currents and scanned voltages corresponding to a plurality of sampling points are obtained, input powers are obtained based on products of the scanned currents and the scanned voltages, and the maximum input power is selected from the input powers.

In a possible implementation, a starting point of the partial IV curve scan is described below. The controller controls the input voltage of each of the K DC-DC conversion circuits to gradually decrease from a second voltage to perform the partial IV curve scan, where the second voltage is an input voltage, of each of the K DC-DC conversion circuits, corresponding to a maximum total input power of the N-K DC-DC conversion circuits when the total input power of the plurality of DC-DC conversion circuits is consistent with that existing before the partial IV curve scan.

This embodiment of this application does not limit an implementation form of an inverter, which may be a centralized inverter or a string inverter. In a possible implementation, the DC-AC conversion circuit, the plurality of DC-DC conversion circuits, and the controller are integrated into a string inverter.

In a possible implementation, the photovoltaic system may include a combiner box, and the plurality of Direct Current-Direct Current (DC-DC) Direct Current-Direct Current (DC-DC) conversion circuits are integrated into the combiner box, and the DC-AC conversion circuit is integrated into a centralized inverter.

On the basis of the photovoltaic system provided in the foregoing embodiment, an embodiment of this application further provides a maximum input power determining method for the photovoltaic system. Advantages of the photovoltaic system are applicable to the following method, and are not described herein again.

An embodiment of this application further provides a maximum input power determining method for a photovoltaic system. The photovoltaic system includes a Direct Current-Alternating Current (DC-AC) conversion circuit and a plurality of Direct Current-Direct Current (DC-DC) conversion circuits, an input end of each of the DC-DC conversion circuits is configured to connect to a corresponding photovoltaic string, and output ends of the plurality of DC-DC conversion circuits are connected in parallel and connected to an input end of the DC-AC conversion circuit. The method includes: performing a partial Current-Voltage (IV) curve scan on each of the DC-DC conversion circuits, and in a process of the partial IV curve scan, controlling a total input power of the plurality of DC-DC conversion circuits to be consistent with that existing before the partial IV curve scan, to obtain a maximum input power of each of the DC-DC conversion circuits; and obtaining a sum of the maximum input powers of all the DC-DC conversion circuits based on the maximum input power of each of the DC-DC conversion circuits, where a scanned voltage of the partial IV curve scan is less than an open-circuit voltage.

In a possible implementation, the plurality of DC-DC conversion circuits include at least a first DC-DC conversion circuit and a second DC-DC conversion circuit. The performing a partial Current-Voltage (IV) curve scan on each of the DC-DC conversion circuits, and in a process of the partial IV curve scan, controlling a total input power of the plurality of DC-DC conversion circuits to be consistent with that existing before the partial IV curve scan, to obtain a maximum input power of each of the DC-DC conversion circuits includes: controlling an input voltage of the first DC-DC conversion circuit to change, to perform the partial IV curve scan to obtain a first maximum input power of the first DC-DC conversion circuit; in a process of performing the IV curve scan on the first DC-DC conversion circuit, adjusting an input power of the second DC-DC conversion circuit, so that a sum of an input power of the first DC-DC conversion circuit and the input power of the second DC-DC conversion circuit is consistent with that existing before the partial IV curve scan; and by analogy, obtaining a second maximum input power of the second DC-DC conversion circuit. The obtaining a sum of the maximum input powers of all the DC-DC conversion circuits based on the maximum input power of each of the DC-DC conversion circuits includes: obtaining the sum of the maximum input powers of all the DC-DC conversion circuits based on the first maximum input power and the second maximum input power.

In a possible implementation, the controlling an input voltage of the first DC-DC conversion circuit to change, to perform the partial IV curve scan includes: controlling the input voltage of the first DC-DC conversion circuit to gradually decrease to perform the partial IV curve scan; recording the scanned voltage and a scanned current of the first DC-DC conversion circuit in the process of the IV curve scan; and stopping scanning when the input power of the first DC-DC conversion circuit decreases and the scanned voltage is less than a voltage existing before the partial IV curve scan.

In a possible implementation, the controlling an input voltage of the first DC-DC conversion circuit to change, to perform the partial IV curve scan includes: controlling the input voltage of the first DC-DC conversion circuit to gradually decrease to perform the partial IV curve scan; recording the scanned voltage and a scanned current of the first DC-DC conversion circuit in the process of the IV curve scan; and stopping scanning when the input power of the first DC-DC conversion circuit is equal to an input power existing before the partial IV curve scan and the scanned voltage is less than a voltage existing before the partial IV curve scan.

In a possible implementation, the controlling the input voltage of the first DC-DC conversion circuit to gradually decrease to perform the partial IV curve scan includes: controlling the input voltage of the first DC-DC conversion circuit to gradually decrease from a first voltage to perform the partial IV curve scan, where the first voltage is an input voltage, of the first DC-DC conversion circuit, corresponding to the maximum input power of the second DC-DC conversion circuit when the total input power of the plurality of DC-DC conversion circuits is consistent with that existing before the partial IV curve scan.

In a possible implementation, the plurality of DC-DC conversion circuits include N circuits in total, and the N DC-DC conversion circuits are divided into at least the following two groups: a first group including K circuits and a second group including N-K circuits, where K is an integer greater than or equal to 2. The performing a Current-Voltage (IV) curve scan on each of the DC-DC conversion circuits, and in a process of the IV curve scan, controlling a total input power of the plurality of DC-DC conversion circuits to be consistent with that existing before the partial IV curve scan, to obtain a maximum input power of each of the DC-DC conversion circuits includes: separately performing the partial IV curve scan on the K DC-DC conversion circuits in the first group; in the process of the partial IV curve scan, controlling a total input power of the N DC-DC conversion circuits to be consistent with that existing before the partial IV curve scan; obtaining the maximum input power of each of the K DC-DC conversion circuits; and by analogy, obtaining the maximum input power of each of the N-K DC-DC conversion circuits.

In a possible implementation, the separately performing the partial IV curve scan on the K DC-DC conversion circuits in the first group includes: controlling the input voltage of each of the K DC-DC conversion circuits to gradually decrease to perform the partial IV curve scan, recording the scanned voltage and a scanned current of each of the K DC-DC conversion circuits, and stopping scanning when the input power of each of the K DC-DC conversion circuits decreases and the scanned voltage is less than a voltage existing before the partial IV curve scan; or controlling the input voltage of each of the K DC-DC conversion circuits to gradually decrease to perform the partial IV curve scan, recording the scanned voltage and a scanned current of each of the K DC-DC conversion circuits, and stopping scanning when the input power of each of the K DC-DC conversion circuits is equal to an input power existing before the partial IV curve scan and the scanned voltage is less than a voltage existing before the partial IV curve scan.

In a possible implementation, the controlling the input voltage of each of the K DC-DC conversion circuits to gradually decrease to perform the partial IV curve scan includes: controlling the input voltage of each of the K DC-DC conversion circuits to gradually decrease from a second voltage to perform the IV curve scan, where the second voltage is an input voltage, of each of the K DC-DC conversion circuits, corresponding to a maximum input power of the N-K DC-DC conversion circuits when the total input power of the plurality of DC-DC conversion circuits is consistent with that existing before the partial IV curve scan.

In a possible implementation, the N DC-DC conversion circuits are divided into m groups, and the partial IV curve scan is performed on the groups in turn, to be specific, each group includes Kj DC-DC conversion circuits, and the partial IV curve scan is performed on the Kj DC-DC conversion circuits simultaneously, where j is equal to 1, 2, . . . , or m. The controller is configured to: perform the partial IV curve scan on the m groups of DC-DC conversion circuits in turn; in the process of the partial IV curve scan, control a total input power of the m groups of DC-DC conversion circuits to remain unchanged, obtain a maximum input power of each of the Kj DC-DC conversion circuits in a $j^{th}$ group, and obtain the sum of the maximum input powers of the N DC-DC conversion circuits based on the maximum input power of each of the DC-DC conversion circuits. In other words, the scan is performed on the m groups in turn, and the IV curve scan may be simultaneously but partial separately performed on the Kj circuits in the same group, to obtain the maximum input powers corresponding to the Kj circuits, then obtain a sum of the maximum input powers in one group, and after the scanning of the m groups is completed, further obtain the sum of the maximum input powers of the m groups.

It can be learned from the foregoing technical solutions that embodiments of this application have the following advantages.

To obtain a total maximum input power in embodiments of this application, it is required to obtain a maximum input power of each inverter. A photovoltaic station may include a plurality of inverters, and a maximum input power of the photovoltaic station is a sum of the maximum input powers of all the inverters. Similarly, for one inverter, the maximum input power of the inverter is a sum of input powers of all DC-DC conversion circuits. The technical solutions provided in the embodiments are as follows: the controller obtains the maximum input power of each DC-DC conversion circuit, and then adds up the maximum input powers of all the DC-DC conversion circuits to obtain the maximum input power of the inverter. To prevent impact on operation of an inverter in a power-limited state during obtaining of a maximum input power of the inverter, the controller controls a total input power of the inverter to remain unchanged when the partial IV curve scan is performed. For example, when an input power of a DC-DC conversion circuit on which the partial IV curve scan is performed changes, an input power of a DC-DC conversion circuit on which the partial IV curve scan is not performed is controlled to change accordingly, so that the sum of the input powers of all the DC-DC conversion circuits remains unchanged. An IV curve scan performed to obtain a maximum input power when the photovoltaic system is in a power-limited state is a partial scan but not a global scan, in other words, is not a conventional IV curve scan. The conventional IV curve scan is a scan from an open-circuit voltage of the photovoltaic string to a short-circuit voltage, in other words, from a maximum voltage to a minimum voltage. However, in this embodiment of this application, to improve scanning efficiency, only the partial IV curve scan is performed, provided that a maximum power point is covered in the scan process, and a maximum input power of a photovoltaic station operating in a power-limited state can be obtained through the partial IV curve scan, to facilitate subsequent power dispatch and control.

BRIEF DESCRIPTION OF DRAWINGS

FIG. 7 is a schematic diagram of a residential photovoltaic system according to an embodiment of this application;

FIG. 8 is a flowchart of a maximum input power determining method according to an embodiment of this application;

DESCRIPTION OF EMBODIMENTS

The following terms "first", "second", and the like are merely intended for a purpose of description, and shall not be understood as an indication or implication of relative importance or implicit indication of a quantity of indicated technical features. Therefore, a feature limited by "first", "second", or the like may explicitly or implicitly include one or more features. In the descriptions of this application, unless otherwise stated, "a plurality of" means two or more than two.

In addition, in this application, directional terms such as "upper" and "lower" may include, but are not limited to, definitions relative to schematic placement directions of components in the accompanying drawings. It should be understood that these directional terms may be relative concepts, are used for relative description and clarification, and may vary with the placement directions of components in the accompanying drawings.

In this application, it should be noted that the term "connection" should be understood in a broad sense unless otherwise expressly specified and limited. For example, the "connection" may be a fixed connection, or may be a detachable connection, or may be an integral connection; may be a direct connection, or may be an indirect connection implemented through a medium. In addition, the term "coupling" may be a manner of implementing an electrical connection for signal transmission. The "coupling" may be a direct electrical connection, or may be an indirect electrical connection through an intermediate medium.

System Embodiment

To make a person skilled in the art understand the technical solutions in embodiments of this application better, the following describes a photovoltaic system provided in an embodiment of this application.

This embodiment of this application does not limit a specific architecture of the photovoltaic system, provided that there are a plurality of Direct Current-Direct Current (DC-DC, Direct Current-Direct Current) conversion circuits that are connected in parallel in the photovoltaic system, and input ends of the DC-DC conversion circuits are connected to corresponding photovoltaic strings. The technical solutions provided in embodiments of this application are applicable to an application scenario of a large-scale photovoltaic power plants, an application scenario of a small and medium-sized distributed power plant, a residential photovoltaic power generation system, and the like. The technical solutions provided in embodiments of this application are applicable to string inverters, and are also applicable to centralized inverters.

Description is first made below by using an example in which the technical solutions provided in embodiments of this application are applied to a photovoltaic system corresponding to a string inverter.

Figure 1:
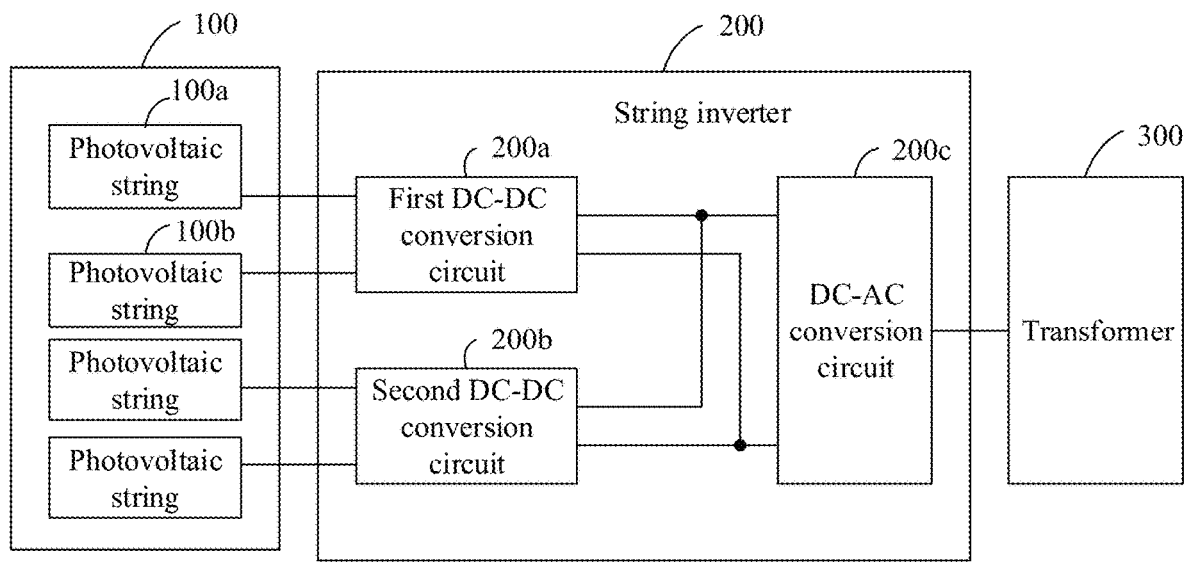
FIG. 1 is a schematic diagram of a photovoltaic system according to an embodiment of this application.

FIG. 1 is a schematic diagram of a photovoltaic system according to an embodiment of this application.

The photovoltaic system provided in this embodiment includes: a photovoltaic string group 100 and a string inverter 200, and may further include a transformer 300.

The string inverter 200 is different from a centralized inverter. The string inverter 200 includes two stages, the first stage is DC-DC conversion circuits, and the second stage is a DC-AC conversion circuit 200c. A part of first-stage DC-DC conversion may include a plurality of DC-DC conversion circuits, and output ends of the plurality of DC-DC conversion circuits are connected in parallel and connected to an input end of the DC-AC conversion circuit 200c. For ease of description and understanding, the following uses two DC-DC conversion circuits as an example for description.

As shown in FIG. 1, an input end of a first DC-DC conversion circuit 200a is connected to a corresponding photovoltaic string 100a and a photovoltaic string 100b, and the photovoltaic string 100a and the photovoltaic string 100b may be connected in parallel and connected to the input end of the first DC-DC conversion circuit 200a. In FIG. 1, two photovoltaic strings are used as an example for description, and the input end of the first DC-DC conversion circuit 200a may be connected to more photovoltaic strings. An input end of a second DC-DC conversion circuit 200b is also connected to two corresponding photovoltaic strings.

An output end of the first DC-DC conversion circuit 200a and an output end of the second DC-DC conversion circuit 200b are connected in parallel and connected to the input end of the DC-AC conversion circuit 200c. It should be understood that the input end of the DC-AC conversion circuit 200c may also be connected to more DC-DC conversion circuits.

During actual operation of the photovoltaic system, the photovoltaic string does not operate at a maximum power point of the photovoltaic string, in other words, the photovoltaic string does not output a maximum power, but operates in a power-limited state in response to an instruction of a controller. Therefore, if a Current-Voltage (IV) curve scan is not performed on the photovoltaic string, a maximum output power of the photovoltaic string cannot be learned, and a maximum input power of the string inverter cannot be learned. However, the photovoltaic station needs to predict the maximum input power of the string inverter to facilitate subsequent power dispatch.

Figure 2:
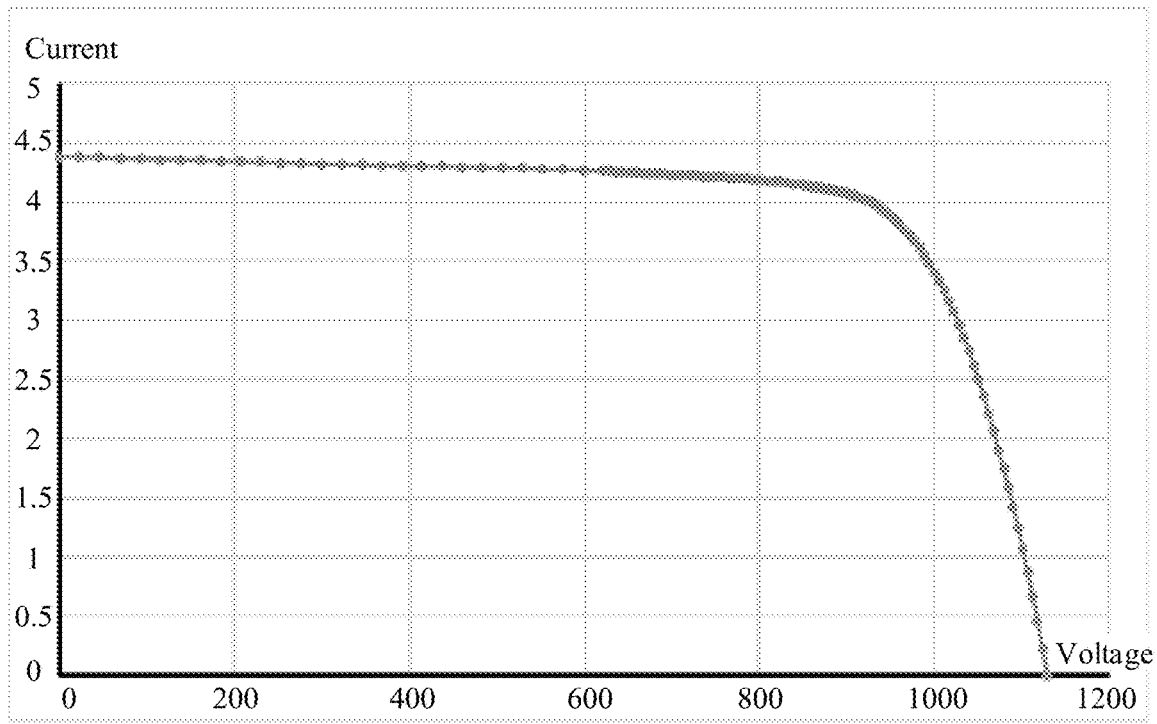
FIG. 2 is a schematic diagram of an IV curve according to an embodiment of this application.

The IV curve scan refers to a scan from an open-circuit voltage to a short-circuit voltage that is performed by controlling an output voltage of a photovoltaic string to obtain a curve relationship between an output current and the output voltage of the photovoltaic string. FIG. 2 is a schematic diagram of an IV curve.

It can be learned from FIG. 2, an abscissa corresponds to the output voltage of the photovoltaic string, and an ordinate corresponds to the output current of the photovoltaic string.

A relationship between the output voltage and the output current of the photovoltaic string is: as the output voltage increases, the output current gradually decreases.

To obtain a total maximum input power in this embodiment of this application, it is required to obtain a maximum input power of each inverter. The photovoltaic station may include a plurality of inverters, and a maximum input power of the photovoltaic station is a sum of the maximum input powers of all the inverters. Similarly, for one inverter, the maximum input power of the inverter is a sum of input powers of all DC-DC conversion circuits. The following describes a manner of obtaining a maximum input power of a single inverter with reference to the accompanying drawings. The technical solution provided in this embodiment is as follows: the controller obtains a maximum input power of each DC-DC conversion circuit, and then adds up the maximum input powers of all the DC-DC conversion circuits to obtain the maximum input power of the inverter. To prevent impact on operation of an inverter in a power-limited state during obtaining of a maximum input power of the inverter, the controller controls a total input power of the inverter to remain unchanged when the partial IV curve scan is performed. For example, when an input power of a DC-DC conversion circuit on which the partial IV curve scan is performed changes, an input power of a DC-DC conversion circuit on which the partial IV curve scan is not performed is controlled to change accordingly, so that the sum of the input powers of all the DC-DC conversion circuits remains unchanged. It should be noted that, in this embodiment of this application, an IV curve scan performed to obtain a maximum input power when the photovoltaic system is in a power-limited state is a partial scan but not a global scan, in other words, is not a conventional IV curve scan. The conventional IV curve scan is a scan from an open-circuit voltage of the photovoltaic string to a short-circuit voltage, in other words, from a maximum voltage to a minimum voltage. However, in this embodiment of this application, to improve scanning efficiency, only the partial IV curve scan is performed, provided that a maximum power point is covered in a scan process.

Figure 3:
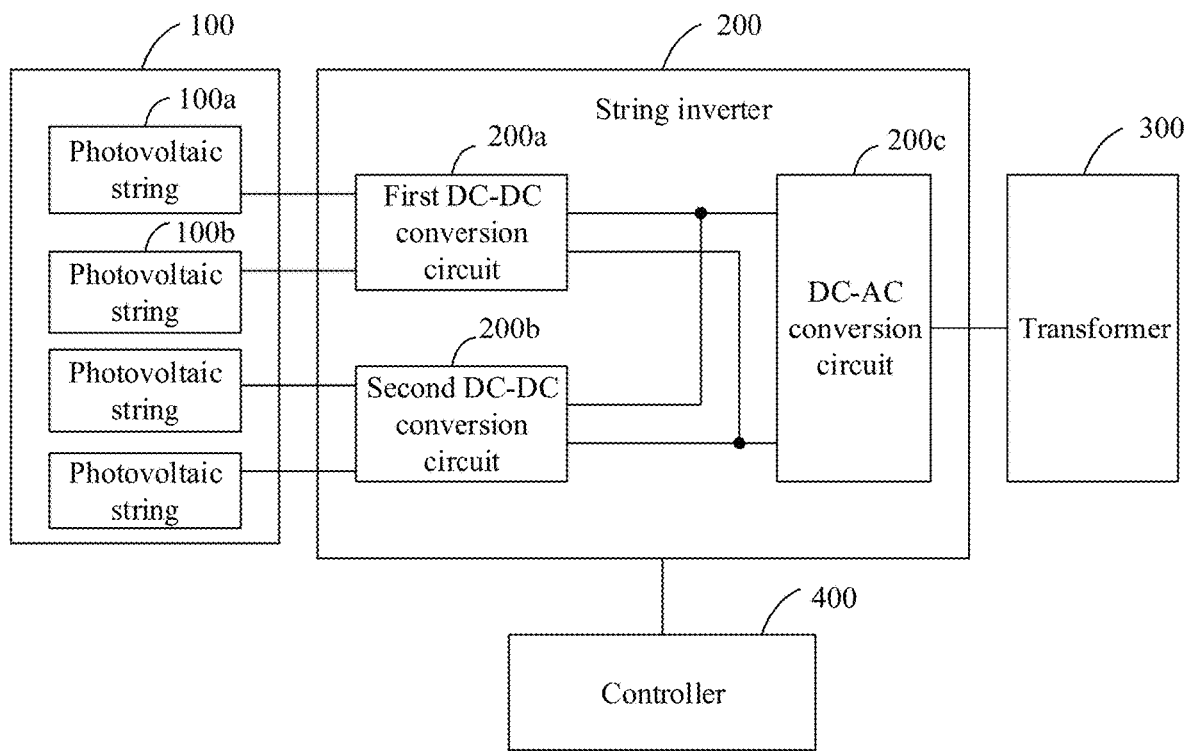
FIG. 3 is a schematic diagram of another photovoltaic system according to an embodiment of this application.

FIG. 3 is a schematic diagram of another photovoltaic system according to an embodiment of this application.

The photovoltaic system provided in this embodiment of this application includes: a controller 400, a Direct Current-Alternating Current (DC-AC) conversion circuit 200c, a plurality of Direct Current-Direct Current (DC-DC) conversion circuits, and a plurality of photovoltaic strings. An input end of each of the DC-DC conversion circuits is connected to a corresponding photovoltaic string, and output ends of the plurality of DC-DC conversion circuits are connected in parallel and connected to an input end of the DC-AC conversion circuit.

The controller 400 is configured to: perform a partial Current-Voltage (IV) curve scan on each of the DC-DC conversion circuits, and in a process of the partial IV curve scan, control a total input power of the plurality of DC-DC conversion circuits to be consistent with that existing before the partial IV curve scan, to obtain a maximum input power of each of the DC-DC conversion circuits; and obtain a sum of the maximum input powers of all the DC-DC conversion circuits based on the maximum input power of each of the DC-DC conversion circuits, where a scanned voltage of the partial IV curve scan is less than an open-circuit voltage.

An output end of a string inverter 200 may be connected to a transformer 300.

It should be noted that when the partial IV curve scan is performed, the total input power of the plurality of DC-DC conversion circuits that are connected in parallel needs to remain unchanged as much as possible, in other words, needs to meet a power limit requirement of the photovoltaic system. The controlling a total input power of the plurality of DC-DC conversion circuits to be consistent with that existing before the partial IV curve scan means that the total power falls within a preset range. Provided that the total input power fluctuates within the preset range, it is considered that the total input power is consistent.

In this embodiment of this application, to improve efficiency of the IV curve scan and obtain the maximum input power of the inverter as soon as possible, the controller 400 may perform the partial IV curve scan on each DC-DC conversion circuit, instead of performing a global IV curve scan on all the DC-DC circuits, in other words, it is not required to perform a scan from the open-circuit voltage to the short-circuit voltage, provided that the scan covers a maximum power point. Usually, a scanned voltage range of the partial IV curve scan is less than a scanned voltage of the conventional global IV curve scan, to be specific, the scanned voltage range of the partial IV curve scan is less than the open-circuit voltage and greater than the short-circuit voltage.

A difference between FIG. 3 and FIG. 1 is that the controller 400 is added, and remaining connection relationships are the same as those in FIG. 1. The following is still used as an example: The input end of the first DC-DC conversion circuit 200a is connected to two photovoltaic strings: the photovoltaic string 100a and the photovoltaic string 100b, and similarly, the input end of the second DC-DC conversion circuit 200b is connected to two photovoltaic strings.

Figure 4A:
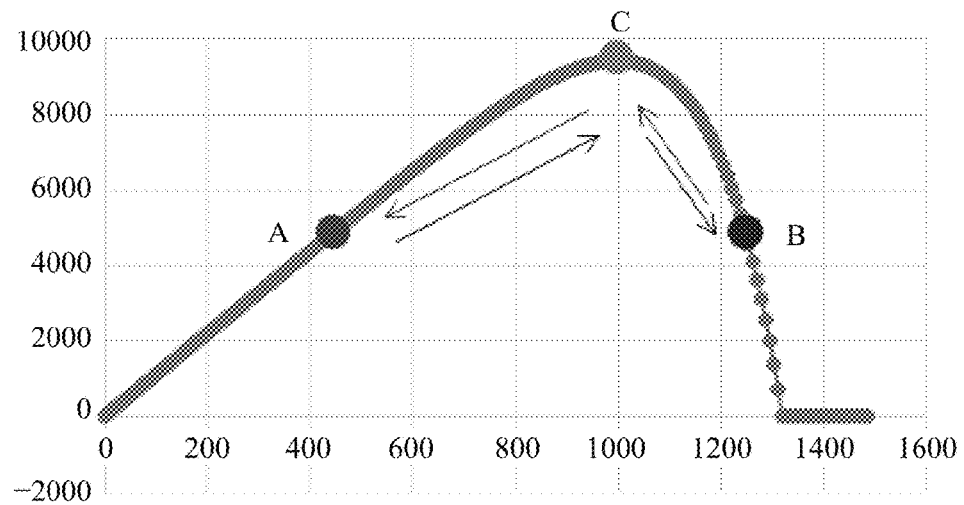
FIG. 4A is a schematic diagram of a partial IV curve scan according to an embodiment of this application.

FIG. 4A is a schematic principle diagram of a partial IV curve scan according to an embodiment of this application.

FIG. 4A is a schematic diagram of a power-voltage curve, namely, a PV curve, of a photovoltaic string. An abscissa is an output voltage of the photovoltaic string, and an ordinate is an output power of the photovoltaic string.

It can be learned from FIG. 4A that the output power first increases as the output voltage increases, and after a maximum power point C is reached, gradually decreases as the output voltage increases.

Usually, to make an operating state more stable, during actual power-limited operation, a steady-state operating point is located on a right side of the maximum power point, such as a point B.

When the controller 400 performs the partial IV curve scan on a DC-DC conversion circuit, for example, from the current steady-state operating point C to the left, in other words, controls an input voltage of the DC-DC conversion circuit to decrease, and forces an input power to increase at the same time, to obtain a power at the maximum power point, it is required to pass the maximum power point and continue to perform the scan to the left, for example, to a point A. An input power is obtained by using a scanned voltage and a scanned current of a scanned sampling point, and it is found that in a process of a scan from the point B to the point C, a power at the point B is largest, and in a process of a scan from the point A to the point B, the power at the point B is also largest. Therefore, the point B is the maximum power point.

It should be understood that after the partial IV curve scan is completed on one DC-DC conversion circuit, the DC-DC conversion circuit continues to operate at the point C as before the IV curve scan.

It can be learned from FIG. 4A that to obtain a maximum input power of one DC-DC conversion circuit, only the partial IV curve scan needs to be performed, provided that a scanned part covers the maximum power point.

For example, two DC-DC conversion circuits are used as an example. FIG. 4A shows a power change process of one DC-DC conversion circuit on which the partial IV curve scan is performed. The following describes a power change process of one DC-DC conversion circuit when the partial IV curve scan is performed on the other DC-DC conversion circuit.

Figure 4B:
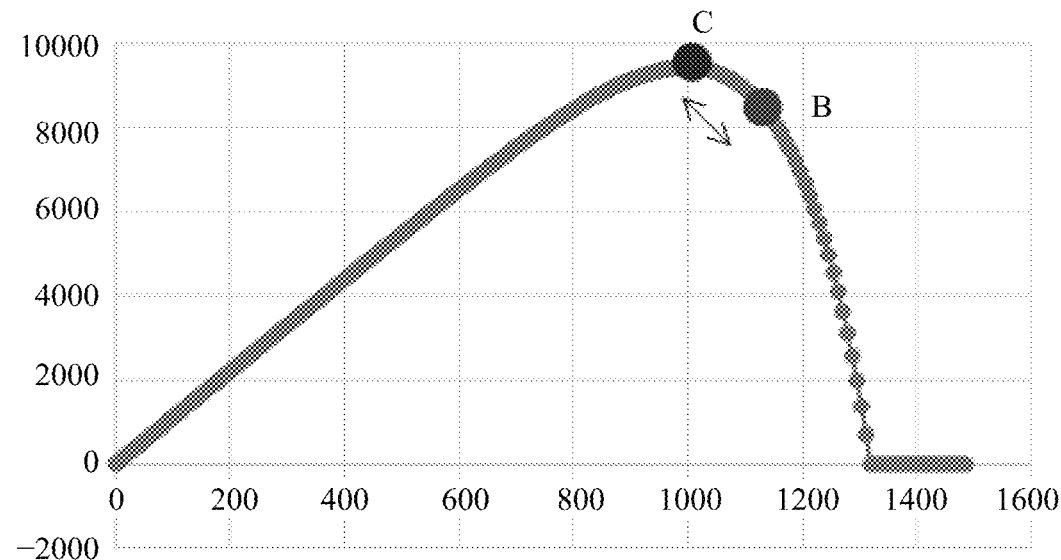
FIG. 4B is a PV curve diagram, corresponding to FIG. 4A, of a DC-DC conversion circuit on which a partial IV curve scan is not performed.

FIG. 4B is a PV curve diagram, corresponding to FIG. 4A, of a DC-DC conversion circuit on which the partial IV curve scan is not performed.

It can be learned from FIG. 4B that when an input power of one DC-DC conversion circuit in FIG. 4A changes, an input power of the other DC-DC conversion circuit that is connected in parallel changes accordingly, that is, changes between the point B and the point C. Further, it can be ensured that a total input power of the two DC-DC conversion circuits that are connected in parallel is consistent with that existing before the partial IV curve scan.

It should be understood that if there are DC-DC conversion circuits on which the partial IV curve scan is not performed, all of the circuits correspond to the power change process shown in FIG. 4B. Details are not be described herein again.

The following continues to use two DC-DC conversion circuits as an example for description. Still refer to FIG. 3. To be specific, the plurality of DC-DC conversion circuits include at least the first DC-DC conversion circuit 200a and the second DC-DC conversion circuit 200b. The input end of the first DC-DC conversion circuit 200a is connected to the corresponding photovoltaic string, the input end of the second DC-DC conversion circuit 200b is connected to the corresponding photovoltaic string, and the output end of the first DC-DC conversion circuit 200a and the output end of the second DC-DC conversion circuit 200b are connected in parallel and connected to the input end of the DC-AC conversion circuit.

The controller is configured to: control an input voltage of the first DC-DC conversion circuit 200a to change, to perform the partial IV curve scan to obtain a first maximum input power of the first DC-DC conversion circuit 200a; in a process of performing the partial IV curve scan on the first DC-DC conversion circuit 200a, adjust an input power of the second DC-DC conversion circuit 200b, so that a sum of an input power of the first DC-DC conversion circuit 200a and the input power of the second DC-DC conversion circuit 200b is consistent with that existing before the partial IV curve scan; and by analogy, after obtaining the maximum input power of the first DC-DC conversion circuit 200a, perform the partial IV curve scan on the second DC-DC conversion circuit 200b, to be specific, control an input voltage of the second DC-DC conversion circuit 200a to change, to perform the partial IV curve scan to obtain a maximum input power of the second DC-DC conversion circuit 200b; in a process of performing the partial IV curve scan on the second DC-DC conversion circuit 200b, adjust the input power of the first DC-DC conversion circuit 200a, so that the sum of the input power of the first DC-DC conversion circuit 200a and the input power of the second DC-DC conversion circuit 200b is consistent with that existing before the partial IV curve scan; and finally, obtain the sum of the maximum input powers of all the DC-DC conversion circuits based on the first maximum input power and the second maximum input power.

The foregoing only uses two DC-DC conversion circuits that are connected in parallel as an example. When N DC-DC conversion circuits connected in parallel are included, it is required to obtain maximum input powers of the N DC-DC conversion circuits in a time-sharing manner, and then the maximum input powers of the N DC-DC conversion circuits are added up to obtain a maximum input power of an inverter.

In the following, two specific implementations of the partial IV curve scan are described by using two DC-DC conversion circuits as an example.

In a first implementation, the scan is performed until the input power changes from gradually increasing to gradually decreasing.

The controller is configured to: control the input voltage of the first DC-DC conversion circuit to gradually decrease to perform the partial IV curve scan; record the scanned voltage and a scanned current of the first DC-DC conversion circuit in the process of the partial IV curve scan; and stop scanning when the input power of the first DC-DC conversion circuit decreases and the scanned voltage is less than a voltage existing before the partial IV curve scan.

It can be learned from the PV curve in FIG. 4A that before the partial IV curve scan, the first DC-DC conversion circuit operates at the steady-state point C that is located on the right side of the maximum power point B. When the input voltage of the first DC-DC conversion circuit is controlled to gradually decrease to perform the partial IV curve scan, due to characteristics of the PV curve, the power increases if the voltage decreases. In other words, an initial partial IV curve scan process is that the power changes from a small value to a large value, in other words, gradually increases. After the maximum power point B is passed, as the voltage gradually decreases, the power no longer increases, but changes from a large value to a small value, in other words, gradually decreases. At this time, it is considered that the partial IV curve scan has covered the maximum power point, and therefore, the scan can be stopped. The controller is configured to obtain the first maximum input power of the first DC-DC conversion circuit based on the scanned voltage and the scanned current. To be specific, the controller may obtain an input power based on a product of a scanned voltage and a scanned current of a sampling point in the process of the partial IV curve scan, and compare an input power corresponding to a current sampling point with an input power corresponding to a previous sampling point, to learn a change trend of the input power.

To ensure that the first implementation of the partial IV curve scan is not affected by power fluctuations, after the input power changes from a large value to a small value, more sampling points may be collected to avoid the following case: the maximum power point is not covered due to a change of the input power from a large value to a small value that is caused by power fluctuations.

In a second implementation, the scan is performed until the input power is equal to an input power existing before the scan.

It can be learned from the PV curve in FIG. 4A that, for the points other than the maximum power point, one power corresponds to two different voltages, one of the voltages is on the right side of the maximum power point, and the other voltage is on the left side of the maximum power point. For example, before the partial IV curve scan, the input power of the first DC-DC conversion circuit is P1; and the partial IV curve scan is performed, partial and then is stopped when the input power changes from a small value to a large value, and then drops from a large value to P1.

The controller is configured to: control the input voltage of the first DC-DC conversion circuit to gradually decrease to perform the partial IV curve scan; record the scanned voltage and a scanned current of the first DC-DC conversion circuit in the process of the partial IV curve scan; and stop scanning when the input power of the first DC-DC conversion circuit is consistent with an input power existing before the partial IV curve scan and the scanned voltage is less than a voltage existing before the partial IV curve scan. In other words, a corresponding power at the steady-state point can be obtained before the scan; an input power corresponding to a sampling point is gradually obtained in a scan process; and the scan is stopped when the input power is found to change from a small value to a large value, and then change from a large value to the power existing before the scan.

The second implementation of the partial IV curve scan can ensure that the maximum input power is obtained more accurately, because stopping the scan not until a power equal to the power corresponding to the steady-state point is scanned can ensure that the maximum power point has been passed.

Usually, the PV curve has only one maximum power point. As shown in FIG. 4A, the PV curve has only one peak. However, a PV curve of a specific photovoltaic string may include a plurality of peaks. The following uses a PV curve including two peaks as an example for description.

Figure 4C:
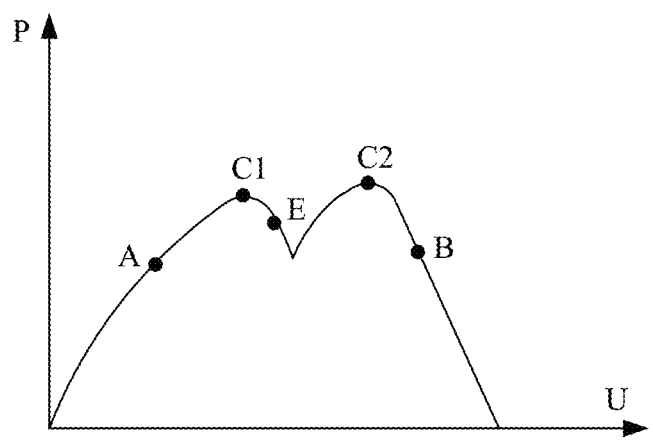
FIG. 4C is a schematic diagram of another partial IV curve scan according to an embodiment of this application.

FIG. 4C is a schematic diagram of another PV curve according to an embodiment of this application;

For a PV curve having a plurality of peaks, for example, two peaks (namely, C1 and C2) as shown in FIG. 4C, a power corresponding to C2 is greater than a power corresponding to C1. E is an operating point in power limit operation.

If the partial IV curve scan is performed directly from a current operating point, to be specific, from a current operating voltage to the left, in other words, an output voltage of the photovoltaic string is controlled to decrease, a true maximum power point may be missed, in other words, the partial IV curve scan does not cover the maximum power point. Therefore, to avoid the foregoing case, when the partial IV curve scan is performed, the output voltage of the photovoltaic string may be controlled to increase first, and then the output voltage of the photovoltaic string may be controlled to decrease.

Another scan manner provided in this embodiment of this application is described below with reference to FIG. 4C.

To be specific, a voltage starting point of the partial IV curve scan described in the foregoing embodiment is not an operating voltage existing before the scan, but a first voltage. The first voltage is an input voltage, of the first DC-DC conversion circuit, corresponding to the maximum input power of the second DC-DC conversion circuit when the total input power of the plurality of DC-DC conversion circuits is consistent with that existing before the partial IV curve scan. In other words, when performing the partial IV curve scan, the controller controls the input voltage of the first DC-DC conversion circuit to gradually decrease from the first voltage to perform the partial IV curve scan. To be specific, an operating point before the scan is E, and if the scan is performed directly from E to the left, the maximum power point C2 may be missed. Therefore, the solution provided in this embodiment of this application is to control the output voltage of the photovoltaic string to increase from the current operating point E, until the input power of another DC-DC conversion circuit can no longer be increased, in other words, the input power of the another DC-DC conversion circuit restricts an input voltage of a scanned DC-DC conversion circuit from continuing to increase. Then, the maximum voltage is used as a starting voltage for the partial IV curve scan, and the partial IV curve scan is performed from the starting voltage to the left, in other words, with the voltage gradually decreasing.

For example, in FIG. 4C, the partial IV curve scan is performed from the point B to the left, and the input voltage of the first DC-DC conversion circuit is controlled to decrease from a voltage corresponding to point B. At this time, the scan may pass the point C2, the point E, the point C1, and the point A.

In addition, to perform the scan more comprehensively in a case with a plurality of peaks, a power equal to the power existing before the scan needs to be scanned, and in addition, the scanned voltage needs to be less than a voltage existing before the partial IV curve scan.

It should be understood that, to avoid impact of the process of the partial IV curve scan on a power-limited output, in the process of performing the partial IV curve scan on the first DC-DC conversion circuit, the controller adjusts the input power of the second DC-DC conversion circuit based on the input power of the first DC-DC conversion circuit, so that the sum of the input power of the first DC-DC conversion circuit and the input power of the second DC-DC conversion circuit is a power limit instruction value of the photovoltaic system. Similarly, in the process of performing the partial IV curve scan on the second DC-DC conversion circuit, the controller adjusts the input power of the first DC-DC conversion circuit based on the input power of the second DC-DC conversion circuit, so that the sum of the input power of the first DC-DC conversion circuit and the input power of the second DC-DC conversion circuit is a power limit instruction value of the photovoltaic system or may fluctuate within a preset range of the power limit instruction value, and then may be considered to be consistent. The power limit instruction value is delivered by the photovoltaic station, or delivered by the controller of the string inverter. For a string inverter, a plurality of DC-DC conversion circuits may correspond to a same controller.

The foregoing embodiment is described by using at least two DC-DC conversion circuits as an example, and the partial IV curve scan is performed on the DC-DC conversion circuits in turn, in other words, only one DC-DC conversion circuit is scanned at a time, and the partial IV curve scan is performed on the circuits in turn. When the photovoltaic system includes excessive DC-DC conversion circuits, performing the partial IV curve scan on the DC-DC conversion circuits in turn is time-consuming and affects efficiency. Therefore, the partial IV curve scan may be simultaneously performed on the plurality of DC-DC conversion circuits, but when the partial IV curve scan is simultaneously performed on the plurality of DC-DC conversion circuits, each DC-DC conversion circuit may be independently scanned for an IV curve corresponding to the DC-DC conversion circuit to obtain the maximum input power corresponding to the DC-DC conversion circuit.

In another photovoltaic system provided in an embodiment of this application, DC-DC conversion circuits may be divided into groups for the partial IV curve scan, and one group includes at least two DC-DC conversion circuits. A quantity of DC-DC conversion circuits included in each group is not limited in this embodiment of this application, provided that the quantity is greater than or equal to 2. In addition, this embodiment of this application does not limit a specific quantity of groups, and allocation may be performed according to actual needs. To be specific, the DC-DC conversion circuits may be grouped evenly or unevenly. It should be understood that, to keep the total input power consistent with that existing before the partial IV curve scan, a smaller fluctuation is preferred, and the DC-DC conversion circuits may be grouped as evenly as possible for the partial IV curve scan.

For example, in a possible implementation, the N DC-DC conversion circuits are divided into m groups, where m is an integer greater than or equal to 2; and the partial IV curve scan is performed on the groups in turn. For example, each group includes Kj DC-DC conversion circuits, where j is equal to 1, 2, 3, . . . , or m, and Kj is an integer greater than or equal to 2. Kj may be equal or unequal for each group. This is not limited in this embodiment of this application. When the partial IV curve scan is separately performed on the groups, the partial IV curve scan is simultaneously performed on the Kj DC-DC conversion circuits.

For example, the plurality of DC-DC conversion circuits of the photovoltaic system include N circuits in total, the N DC-DC conversion circuits are divided into m groups, and each group includes Kj DC-DC conversion circuits. Kj may be equal or unequal for each group. The N circuits may be divided evenly or unevenly into m groups. For ease of description, the following uses equal division as an example. For example, when 12 circuits are included and are divided into three groups, each group includes four circuits. For example, when 13 circuits are included and are evenly divided, the 13 circuits may be divided into three groups with a remainder being classified into one of the groups, then two of the groups each include four circuits, and the last group may include five circuits. For example, when 11 circuits are included and are evenly divided into three groups, two of the groups each include four circuits, and the last group may include three circuits. The same is true for other cases, and no enumeration is provided herein. When unevenly divided, the circuits may be randomly divided. This is not limited in this embodiment of this application.

The controller is configured to: perform the partial IV curve scan on the m groups of DC-DC conversion circuits in turn; in the process of the partial IV curve scan, control a total input power of the m groups of DC-DC conversion circuits to be consistent with that existing before the partial IV curve scan, obtain a maximum input power of each of the Kj DC-DC conversion circuits in a $j^{th}$ group, and obtain the sum of the maximum input powers of the N DC-DC conversion circuits based on the maximum input power of each of the DC-DC conversion circuits, where j is equal to 1, 2, . . . , or m.

In other words, the scan is performed on the m groups in turn, and the IV curve scan may be simultaneously but partial separately performed on the Kj circuits in the same group, to obtain the maximum input powers corresponding to the Kj circuits, then obtain a sum of the maximum input powers in one group, and after the scanning of the m groups is completed, further obtain the sum of the maximum input powers of the m groups.

To facilitate understanding, the following provides a description by using an example in which the N DC-DC conversion circuits are divided into at least two groups.

The plurality of DC-DC conversion circuits include N circuits in total, and the N DC-DC conversion circuits are divided into at least the following two groups: a first group including K circuits and a second group including N-K circuits, where K is an integer greater than or equal to 2. This embodiment of this application does not limit whether K is equal to N-K, and the two may be equal or unequal.

Figure 6:
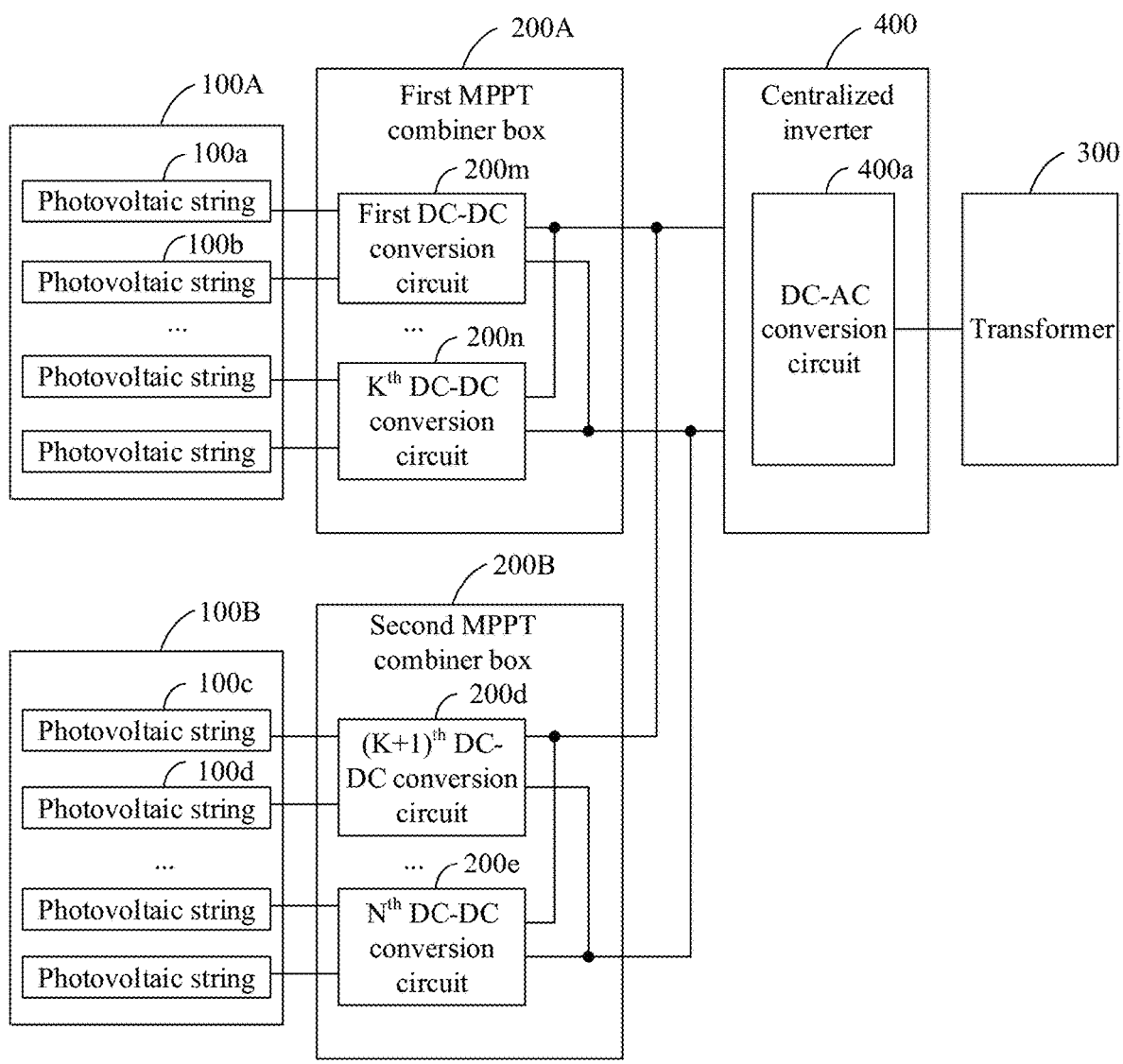
FIG. 6 is a schematic diagram of yet another photovoltaic system according to an embodiment of this application.

As shown in FIG. 6, further, the following two combiner boxes are used as an example: a first MPPT combiner box 200A and a second MPPT combiner box 200B. The N DC-DC conversion circuits are divided into two groups to correspond to the two combiner boxes, respectively.

The first MPPT combiner box 200A includes K DC-DC conversion circuits: a first DC-DC conversion circuit 200$m$ to a $K^{th}$ DC-DC conversion circuit 200$n$. Similarly, the second MPPT combiner box 200B includes N-K DC-DC conversion circuits: a $(K+1)^{th}$ DC-DC conversion circuit 200$d$ to an $N^{th}$ DC-DC conversion circuit 200$e$.

The controller is configured to: separately perform the partial IV curve scan on the K DC-DC conversion circuits in the first group; in the process of the partial IV curve scan, control a total input power of the N DC-DC conversion circuits to be consistent with that existing before the partial IV curve scan; obtain the maximum input power of each of the K DC-DC conversion circuits; by analogy, obtain the maximum input power of each of the N-K DC-DC conversion circuits; and obtain the sum of the maximum input powers of the N DC-DC conversion circuits based on the maximum input power of each of the DC-DC conversion circuits.

When the partial IV curve scan is performed on the N-K DC-DC conversion circuits, input powers of the K DC-DC conversion circuits are adjusted, so that the total input power of the N DC-DC conversion circuits is consistent with that existing before the partial IV curve scan, and the maximum input power of each of the N-K DC-DC conversion circuits is obtained.

It should be noted that when the partial IV curve scan is performed on the K circuits at the same time, the K circuits may reach maximum power points at the same time. Therefore, the maximum input powers of the K DC-DC conversion circuits may be obtained at the same time. Similarly, when the partial IV curve scan is performed on the N-K circuits, the N-K circuits may also be controlled to reach maximum power points at the same time, in other words, the maximum input powers of the N-K DC-DC conversion circuits may be obtained at the same time.

cases in which the partial IV curve scan is performed on each DC-DC conversion circuit may be similar to the foregoing case of performing the partial IV curve scan on the circuits in turn. In a first case, the partial IV curve scan may be stopped when a scanned power changes from a large value to a small value. In a second case, the partial IV curve scan is stopped when a scanned power is equal to a power existing before the scan.

First Case:

The controller is configured to: control the input voltage of each of the K DC-DC conversion circuits to gradually decrease to perform the IV curve scan; record the scanned voltage and a scanned current of each of the K DC-DC conversion circuits; and stop scanning when the input power of each of the K DC-DC conversion circuits decreases and the scanned voltage is less than a voltage existing before the partial IV curve scan. The controller obtains the maximum input power of each of the K DC-DC conversion circuits based on the scanned voltage and the scanned current of each of the K DC-DC conversion circuits.

Second Case:

The controller is configured to: control the input voltage of each of the K DC-DC conversion circuits to gradually decrease to perform the IV curve scan; record the scanned voltage and a scanned current of each of the K DC-DC conversion circuits; and stop scanning when the input power of each of the K DC-DC conversion circuits is equal to an input power existing before the IV curve scan and the scanned voltage is less than a voltage existing before the partial IV curve scan. The controller obtains the maximum input power of each of the K DC-DC conversion circuits based on the scanned voltage and the scanned current of each of the K DC-DC conversion circuits.

The foregoing only describes a determining condition for stopping the partial IV curve scan. To improve scanning efficiency and ensure that a maximum input power point is covered, a voltage corresponding to a scan starting moment may be maximized. The following describes a manner of determining a scanned voltage corresponding to a scan starting point. For example, the controller controls the input voltage of each of the K DC-DC conversion circuits to gradually decrease from a second voltage to perform the partial IV curve scan, where the second voltage is an input voltage, of each of the K DC-DC conversion circuits, corresponding to a maximum total input power of the N-K DC-DC conversion circuits when the total input power of the plurality of DC-DC conversion circuits is consistent with that existing before the partial IV curve scan.

For ease of understanding, the following uses a string inverter as an example for description. The N DC-DC conversion circuits are divided into two groups, in other words, M is 2. The first group includes K circuits, and the second group includes N-K circuits. K may be equal or unequal to N-K. This embodiment of this application is applicable to the foregoing two cases.

The N DC-DC conversion circuits included in the string inverter are respectively denoted as a first DC-DC conversion circuit, a second DC-DC conversion circuit, a third DC-DC conversion circuit, . . . , and an $N^{th}$ DC-DC conversion circuit. The string inverter is in a power-limited state, and a total input power is denoted as $P_{lmt}$.

Step 1:

The controller controls input powers of the first, the second, the third, . . . , and the $K^{th}$ DC-DC conversion circuits to decrease, and at the same time, increases input powers of the $(K+1)^{th}$, the $(K+2)^{th}$, . . . , and the $N^{th}$ DC-DC conversion circuits, to control the total input power to remain at $P_{lmt}$ until the $(K+1)^{th}$, the $(K+2)^{th}$, . . . , and the $N^{th}$ DC-DC conversion circuits reach maximum input powers, and denotes the input powers of the first, the second, the third, . . . , and the $K^{th}$ DC-DC conversion circuits as $P_l$, where l is equal to 1, 2, 3, . . . , or K. Input voltages of the first, the second, the third, . . . , and the $K^{th}$ DC-DC conversion circuits in this case are denoted as $U_l$, where l is equal to 1, 2, 3, . . . , or K.

Step 1 is to obtain initial scanned voltages of the first to the $K^{th}$ DC-DC conversion circuits during the IV curve scan, in other words, the IV curve scan is performed with a voltage gradually decreasing from the initial scanned voltage. Step 1 is a preparatory process for the IV curve scan. The maximum input powers of the $(K+1)^{th}$ to the $N^{th}$ DC-DC conversion circuits correspond to maximum input voltages of the first to the $K^{th}$ DC-DC conversion circuits. Because the total input power remains unchanged, when the input powers of the $(K+1)^{th}$ to the $N^{th}$ DC-DC conversion circuits can no longer increase, the corresponding input voltages of the first to the $K^{th}$ DC-DC conversion circuits can no longer increase.

For the string inverter, the controller may be a controller of the string inverter. The DC-DC conversion circuit may be a step-up circuit, such as a boost circuit, or may be another type of conversion circuit, such as a buck circuit or a buck-boost circuit.

Step 2:

The controller controls the first, the second, the third, . . . , and the $K^{th}$ DC-DC conversion circuits to be in a partial IV curve scan mode, that is, gradually decreases the input voltages of the first, the second, the third, . . . , and the $K^{th}$ DC-DC conversion circuits starting from $U_1$ obtained in step 1, where l is equal to 1, 2, 3, . . . , or K; and at the same time, controls the input powers of the $(K+1)^{th}$ the $(K+2)$th, . . . , and the $N^{th}$ DC-DC conversion circuits, to control the total input power to remain at $P_{lmt}$.

Step 3:

Curves of changes of the input powers of the first, the second, the third, . . . , and the $K^{th}$ DC-DC conversion circuits along with the input voltages are recorded, and it is determined that voltages at maximum power points of the first, the second, the third, . . . , and the $K^{th}$ DC-DC conversion circuits are $U_{mppt\_1}$, and maximum input powers at the maximum power points are $P_{mppt\_1}$.

Step 4:

The foregoing process is repeated for the remaining N-K DC-DC conversion circuits until voltages $U_{mppt\_j}$ and maximum input powers $P_{mppt\_j}$ at maximum power points of all the DC-DC conversion circuits are obtained, where j is equal to 1, 2, 3, . . . , or K.

Step 5:

A sum of the maximum input powers of all the DC-DC conversion circuits is calculated, and denoted as $P_{max}$ that is an estimated maximum input power of the string inverter.

When the photovoltaic system includes a centralized inverter instead of a string inverter, an input end of the centralized inverter is connected to a combiner box, and the foregoing estimated maximum input power is a maximum input power of the combiner box.

The embodiment corresponding to FIG. 3 is described by using the string inverter as an example. It should be understood that all the technical solutions provided in embodiments of this application are not only applicable to a photovoltaic system corresponding to a string inverter, but also applicable to a photovoltaic system corresponding to a centralized inverter, provided that the photovoltaic system includes a plurality of DC-DC conversion circuits with output ends connected in parallel, in other words, a DC-DC converter.

As shown in FIG. 3, when the photovoltaic system includes the string inverter 200, the DC-AC conversion circuit 200c, the plurality of DC-DC conversion circuits 200a and 200b, and the controller 400 may be integrated into the string inverter 200. FIG. 3 is merely an example, the controller 400 may alternatively be located outside the string inverter 200, in other words, only the DC-AC conversion circuit 200c and the plurality of DC-DC conversion circuits 200a and 200b are included in the string inverter 200. The controller 400 controls an input voltage of each DC-DC conversion circuit to change, thereby completing the IV curve scan.

Figure 5:
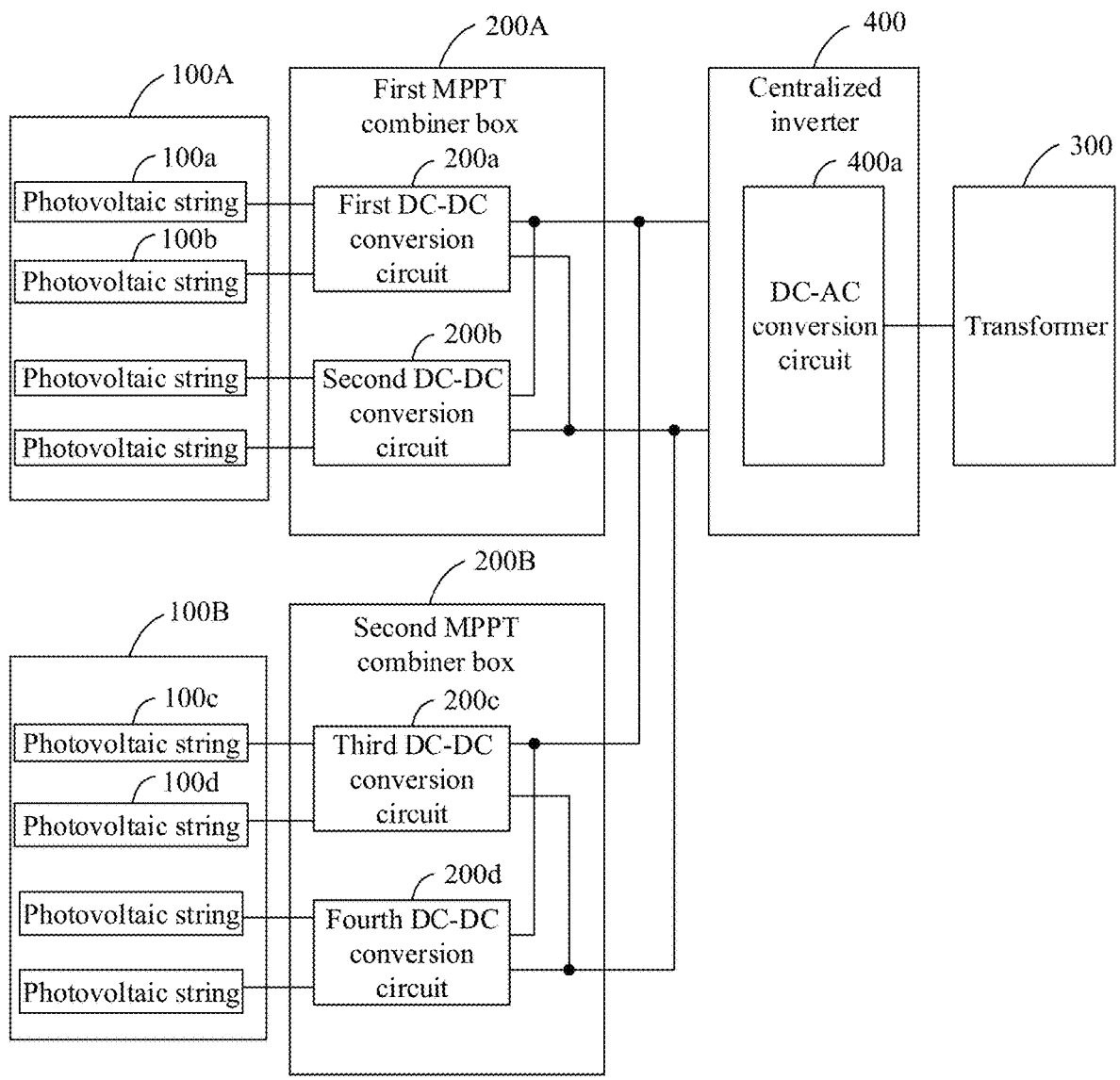
FIG. 5 is a schematic diagram of still another photovoltaic system according to an embodiment of this application.

The technical solutions provided in the foregoing embodiments may also be applied to a photovoltaic system including a centralized inverter. FIG. 5 is a schematic diagram of another photovoltaic system according to an embodiment of this application.

Usually, an electrical distance between a centralized inverter 400 and a photovoltaic string is long, and therefore an output voltage of the photovoltaic string cannot be directly controlled. In this case, a combiner box may be used to control the output voltage of the photovoltaic string, or a photovoltaic optimizer may be added between a DC-DC conversion circuit and the photovoltaic string, and the photovoltaic optimizer is used to control the output voltage of the photovoltaic string, thereby implementing an IV curve scan on the photovoltaic string. In FIG. 5, that the combiner box implements the IV curve scan is used as an example for description. Each combiner box may include one controller, and the controller of each combiner box may change input voltages of the DC-DC conversion circuits, thereby completing the partial IV curve scan.

An example in which the combiner box is a maximum power point tracking (MPPT, Maximum Power Point Tracking) combiner box is used for description, a plurality of MPPT combiner boxes may be included. Output ends of the plurality of combiner boxes may be connected in parallel to input ends of the centralized inverter 400. This embodiment is described by using an example in which at least the following two MPPT combiner boxes are included: a first MPPT combiner box 200A and a second MPPT combiner box 200B.

Each MPPT combiner box may include a plurality of DC-DC conversion circuits. In this embodiment, at least two DC-DC conversion circuits are used as an example. To be specific, the first MPPT combiner box 200A includes a first DC-DC conversion circuit 200a and a second DC-DC conversion circuit 200b. An input end of each of the DC-DC conversion circuits is connected to a corresponding photovoltaic string, for example, an input terminal of the first DC-DC conversion circuit 200a is connected to a photovoltaic string 100a and a photovoltaic string 100b. Output ends of the plurality of DC-DC conversion circuits in each combiner box are connected in parallel. For example, an output terminal of the first DC-DC conversion circuit 200a and an output terminal of the second DC-DC conversion circuit 200b are connected in parallel.

Similarly, the second MPPT combiner box 200B includes a third DC-DC conversion circuit 200c and a fourth DC-DC conversion circuit 200d. An input end of each of the DC-DC conversion circuits is connected to a corresponding photovoltaic string. For example, an input terminal of the third DC-DC conversion circuit 200c is connected to a photovoltaic string 100c and a photovoltaic string 100d. Output ends of the plurality of DC-DC conversion circuits in each combiner box are connected in parallel. For example, an output terminal of the third DC-DC conversion circuit 200c and an output terminal of the fourth DC-DC conversion circuit 200d are connected in parallel.

The centralized inverter 400 includes a DC-AC conversion circuit 400a. An output end of the centralized inverter 400 may be connected to a transformer 300, and an output end of the transformer 300 may be connected to an alternating current power grid.

A first controller of the first MPPT combiner box 200A obtains a first maximum input power of the first MPPT combiner box 200A, and a second controller of the second MPPT combiner box 200B obtains a second maximum input power of the second MPPT combiner box 200B. The first controller sends the first maximum input power to a host computer, the second controller sends the second maximum input power to the host computer, and the host computer obtains a total maximum input power of the photovoltaic system based on the first maximum input power and the second maximum input power.

This embodiment of this application does not limit a quantity of phases of an alternating current corresponding to the photovoltaic system, for example, the photovoltaic system may correspond to a three-phase alternating current, or may correspond to a single-phase alternating current. For example, for a residential photovoltaic system, a household photovoltaic system corresponds to a single-phase alternating current that may be directly supplied to a household power consuming device, such as a refrigerator, an air conditioner, and a washing machine.

FIG. 7 is a schematic diagram of a household photovoltaic system according to an embodiment of this application.

Usually, the household photovoltaic system may use a string inverter 500, and the string inverter 500 outputs a single-phase alternating current, while a three-phase inverter outputs a three-phase alternating current.

An input end of the string inverter 500 of the household photovoltaic system is connected to a photovoltaic string 100a through a direct current switch S1 and connected to an another photovoltaic string 100a through a direct current switch S2. A DC-DC conversion circuit and a DC-AC conversion circuit may be included in the string inverter 500. An output end of the string inverter 500 is connected to an input end of a single-phase alternating current through an alternating current switch KM. In case of a fault or in a switching-on or switching-off process, the alternating current switch KM may be controlled to be closed or opened.

The photovoltaic system provided in this embodiment of this application may obtain the maximum input power of the system when the photovoltaic system operates at a limited power. This is convenient for subsequent control and power dispatch. Because the partial IV curve scan is performed in the solution provided in this embodiment of this application, a scanning speed can be increased, and the maximum input power can be obtained as soon as possible. In addition, the technical solution provided in this embodiment of this application is to perform the IV curve scan on each DC-DC conversion circuit in the photovoltaic system, thereby avoiding a power estimation error caused by shading or failure of an individual photovoltaic string. With the technical solution provided in this embodiment of this application, the maximum input power of the system can be obtained more accurately.

Method Embodiment

On the basis of the photovoltaic system provided in the foregoing embodiment, this embodiment of this application further provides a maximum input power determining method. The method is described in detail below with reference to the accompanying drawings.

FIG. 8 is a flowchart of a maximum input power determining method for a photovoltaic system according to an embodiment of this application.

The maximum input power determining method for a photovoltaic system provided in this embodiment of this application is applied to the photovoltaic system described in the foregoing embodiment. The photovoltaic system includes: a Direct Current-Alternating Current (DC-AC) conversion circuit, a plurality of Direct Current-Direct Current (DC-DC) conversion circuits, and a plurality of photovoltaic strings. An input end of each of the DC-DC conversion circuits is connected to a corresponding photovoltaic string, and output ends of the plurality of DC-DC conversion circuits are connected in parallel and connected to an input end of the DC-AC conversion circuit.

The method includes the following steps.

S701: Perform a partial Current-Voltage (IV) curve scan on each of the DC-DC conversion circuits, and in a process of the partial IV curve scan, control a total input power of the plurality of DC-DC conversion circuits to be consistent with that existing before the partial IV curve scan, to obtain a maximum input power of each of the DC-DC conversion circuits.

Since the photovoltaic system operates in a power-limited state, each DC-DC conversion circuit does not operate at a maximum power point. To obtain a maximum input power of the system, it is required to obtain the maximum input power of each of DC-DC conversion circuits, and then add up the maximum input powers of all the DC-DC conversion circuits to obtain a total input maximum power.

To improve scanning efficiency and obtain the total maximum input power as soon as possible, the partial IV curve scan is performed on each DC-DC conversion circuit. A scanned voltage of the partial IV curve scan is less than an open-circuit voltage, and the scanned voltage of the partial IV curve scan is greater than a short-circuit voltage.

S702: Obtain a sum of the maximum input powers of all the DC-DC conversion circuits based on the maximum input power of each of the DC-DC conversion circuits.

During the partial IV curve scan, to ensure that the system operates in the power-limited state, the total input power needs to be consistent with that existing before the scan.

In specific implementation, the partial IV curve scan may be performed on the DC-DC conversion circuits in turn in a time sharing manner, or the partial IV curve scan may be simultaneously performed on several DC-DC conversion circuits.

According to the maximum input power determining method provided in this embodiment of this application, the maximum input power can be obtained when the photovoltaic system operates in the power-limited state. When a power loss is ignored, input powers of all the DC-DC conversion circuits are the total input power of the entire photovoltaic system. Because the photovoltaic system operates in the power-limited state, each photovoltaic string does not output its own maximum power. Therefore, it is required to separately perform the partial IV curve scan to obtain a power corresponding to the maximum power point. To avoid affecting a normal power-limited state, and keep the total input power of all the DC-DC conversion circuits unchanged, when some of the DC-DC conversion circuits are controlled to perform the partial IV curve scan, input powers of the other DC-DC conversion circuits on which the partial IV curve scan is not performed are controlled to change accordingly. By analogy, the maximum input powers of all the DC-DC conversion circuits are obtained, and the sum of the maximum input powers of all the DC-DC conversion circuits is a predicted maximum input power of the photovoltaic system. This is convenient for subsequent control of a photovoltaic station and overall power dispatch of the station.

An example in which the partial IV curve scan is performed on the DC-DC conversion circuits in turn in the time sharing manner is used as an example for description below.

For ease of description, a process of obtaining the maximum input power is described by using two DC-DC conversion circuits as an example. The plurality of DC-DC conversion circuits include at least a first DC-DC conversion circuit and a second DC-DC conversion circuit.

Figure 9:
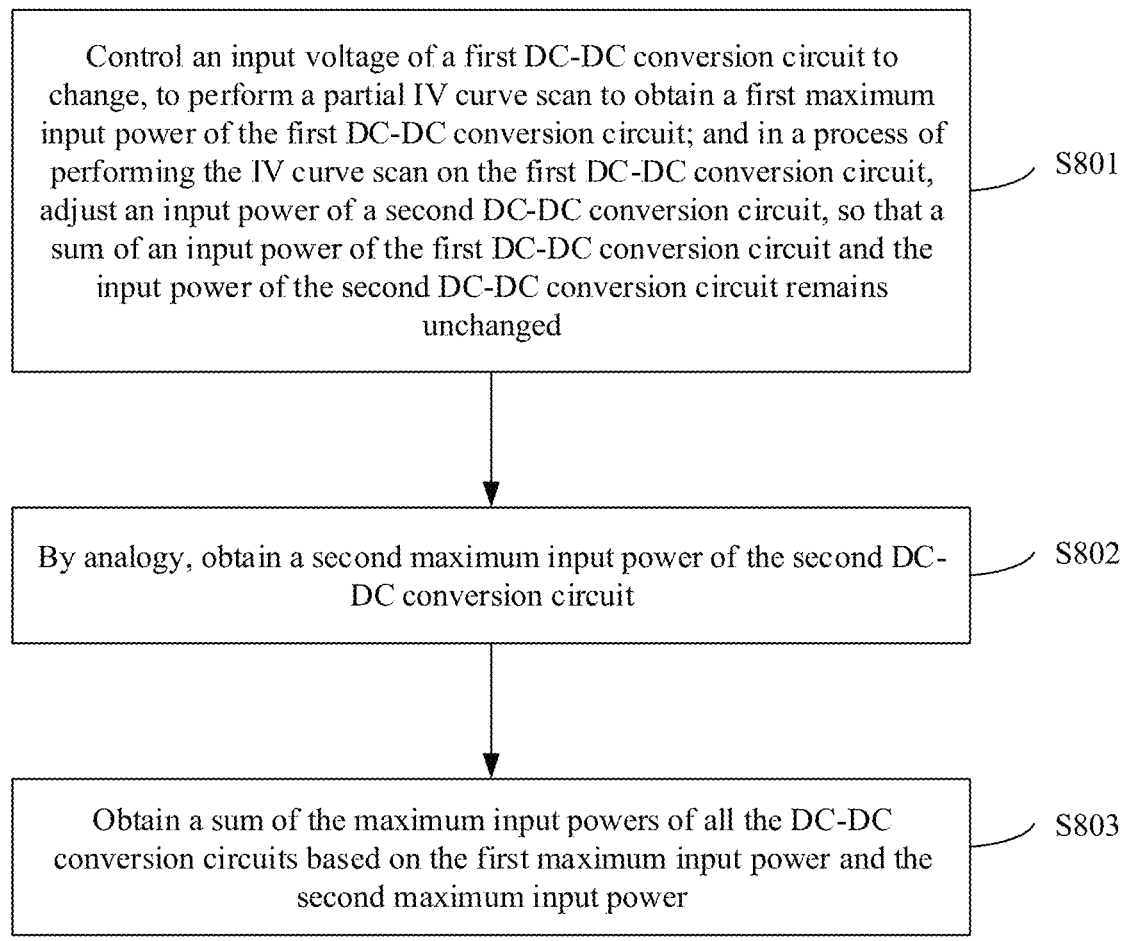
FIG. 9 is a flowchart of another maximum input power determining method according to an embodiment of this application.

FIG. 9 is a flowchart of another maximum input power determining method according to an embodiment of this application.

The performing a partial IV curve scan on each of the DC-DC conversion circuits, and in a process of the partial IV curve scan, controlling a total input power of the plurality of DC-DC conversion circuits to remain unchanged, to obtain a maximum input power of each of the DC-DC conversion circuits includes:

S801: Control an input voltage of the first DC-DC conversion circuit to change, to perform the partial IV curve scan to obtain a first maximum input power of the first DC-DC conversion circuit; and in a process of performing the partial IV curve scan on the first DC-DC conversion circuit, adjust an input power of the second DC-DC conversion circuit, so that a sum of an input power of the first DC-DC conversion circuit and the input power of the second DC-DC conversion circuit is consistent with that existing before the partial IV curve scan.

S802: By analogy, obtain a second maximum input power of the second DC-DC conversion circuit. Similarly, when the partial IV curve scan is performed on the second DC-DC conversion circuit, the input power of the first DC-DC conversion circuit needs to be adjusted, so that the total input power is consistent with that existing before the partial IV curve scan.

The obtaining a sum of the maximum input powers of all the DC-DC conversion circuits based on the maximum input power of each of the DC-DC conversion circuits includes:

S803: Obtain the sum of the maximum input powers of all the DC-DC conversion circuits based on the first maximum input power and the second maximum input power.

A specific process of the partial IV curve scan is described below.

In a first manner, the controlling an input voltage of the first DC-DC conversion circuit to change, to perform the partial IV curve scan includes:

controlling the input voltage of the first DC-DC conversion circuit to gradually decrease to perform the IV curve scan; recording the scanned voltage and a scanned current of the first DC-DC conversion circuit in the process of the IV curve scan; and stopping scanning when the input power of the first DC-DC conversion circuit decreases and the scanned voltage is less than a voltage existing before the partial IV curve scan.

In a second manner, the controlling an input voltage of the first DC-DC conversion circuit to change, to perform the partial IV curve scan includes:

controlling the input voltage of the first DC-DC conversion circuit to gradually decrease to perform the IV curve scan; recording the scanned voltage and a scanned current of the first DC-DC conversion circuit in the process of the IV curve scan; and stopping scanning when the input power of the first DC-DC conversion circuit is equal to an input power existing before the IV curve scan and the scanned voltage is less than a voltage existing before the partial IV curve scan.

The controlling the input voltage of the first DC-DC conversion circuit to gradually decrease to perform the IV curve scan includes:

controlling the input voltage of the first DC-DC conversion circuit to gradually decrease from a first voltage to perform the IV curve scan, where the first voltage is an input voltage, of the first DC-DC conversion circuit, corresponding to the maximum input power of the second DC-DC conversion circuit when the total input power of the plurality of DC-DC conversion circuits remains unchanged.

The plurality of DC-DC conversion circuits include N circuits in total, the N DC-DC conversion circuits include M groups, where M is an integer greater than or equal to 2, each group includes K DC-DC conversion circuits, and K is an integer greater than or equal to 1.

The performing a partial Current-Voltage (IV) curve scan on each of the DC-DC conversion circuits, and in a process of the IV curve scan, controlling a total input power of the plurality of DC-DC conversion circuits to remain unchanged, to obtain a maximum input power of each of the DC-DC conversion circuits includes:

separately performing the IV curve scan on the K DC-DC conversion circuits in the first group; in the process of the IV curve scan, controlling a total input power of the M groups of DC-DC conversion circuits to remain unchanged; and obtaining the maximum input power of each of the K DC-DC conversion circuits.

For ease of description, the following provides a description by using an example in which the plurality of DC-DC conversion circuits are divided into at least two groups to perform the partial IV curve scan.

The plurality of DC-DC conversion circuits include N circuits in total, and the N DC-DC conversion circuits are divided into at least the following two groups: a first group including K circuits and a second group including N-K circuits, where K is an integer greater than or equal to 2.

Figure 10:
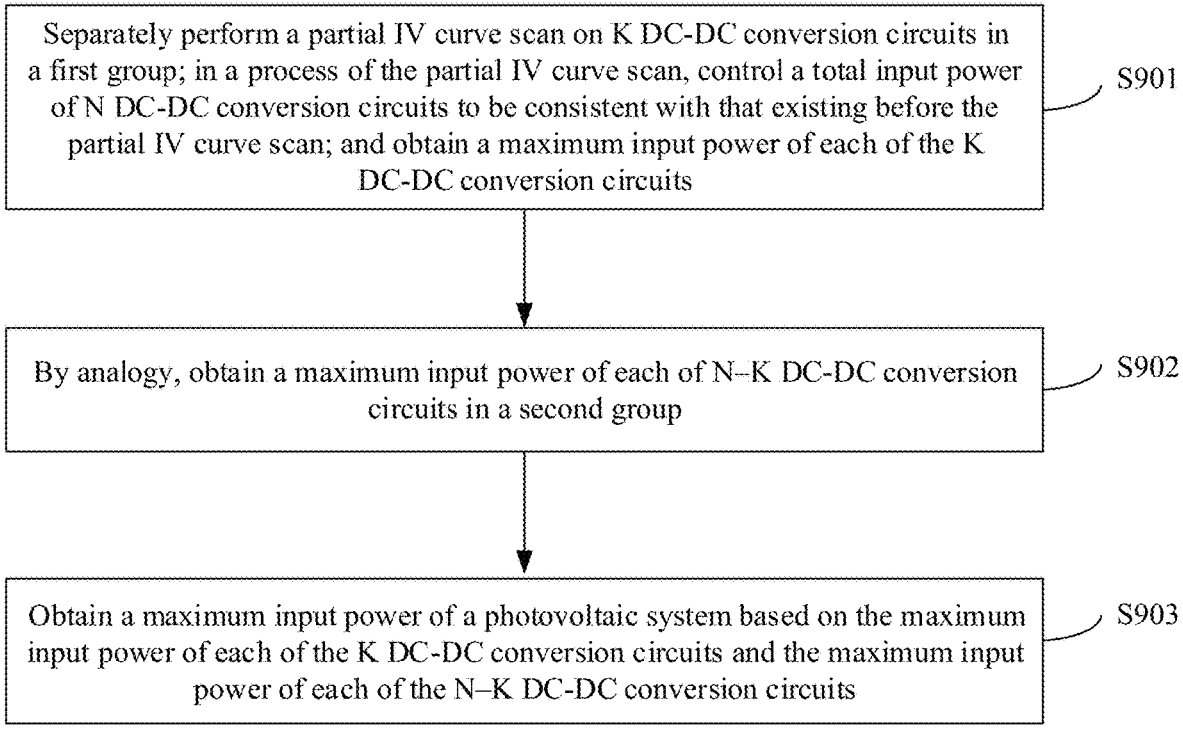
FIG. 10 is a flowchart of still another maximum input power determining method according to an embodiment of this application.

FIG. 10 is a flowchart of still another maximum input power determining method according to an embodiment of this application.

The performing a Current-Voltage (IV) curve scan on each of the DC-DC conversion circuits, and in a process of the IV curve scan, controlling a total input power of the plurality of DC-DC conversion circuits to be consistent with that existing before the partial IV curve scan, to obtain a maximum input power of each of the DC-DC conversion circuits includes: S901 and S902.

S901: Separately perform the partial IV curve scan on the K DC-DC conversion circuits in the first group; in the process of the partial IV curve scan, control a total input power of the N DC-DC conversion circuits to be consistent with that existing before the partial IV curve scan; and obtain the maximum input power of each of the K DC-DC conversion circuits.

S902: By analogy, obtain a maximum input power of each of the N-K DC-DC conversion circuits in the second group.

S903: Obtain a maximum input power of the photovoltaic system based on the maximum input power of each of the K DC-DC conversion circuits and the maximum input power of each of the N-K DC-DC conversion circuits.

The separately performing the partial IV curve scan on the K DC-DC conversion circuits in the first group includes:

controlling the input voltage of each of the K DC-DC conversion circuits to gradually decrease to perform the partial IV curve scan; recording the scanned voltage and a scanned current of each of the K DC-DC conversion circuits; and stopping scanning when the input power of each of the K DC-DC conversion circuits decreases and the scanned voltage is less than a voltage existing before the partial IV curve scan; or controlling the input voltage of each of the K DC-DC conversion circuits to gradually decrease to perform the partial IV curve scan; recording the scanned voltage and a scanned current of each of the K DC-DC conversion circuits; and stopping scanning when the input power of each of the K DC-DC conversion circuits is equal to an input power existing before the partial IV curve scan and the scanned voltage is less than a voltage existing before the partial IV curve scan.

The controlling the input voltage of each of the K DC-DC conversion circuits to gradually decrease to perform the partial IV curve scan includes:

controlling the input voltage of each of the K DC-DC conversion circuits to gradually decrease from a second voltage to perform the IV curve scan, where the second voltage is an input voltage, of each of the K DC-DC conversion circuits, corresponding to a maximum input power of the N-K DC-DC conversion circuits when the total input power of the plurality of DC-DC conversion circuits is consistent with that existing before the partial IV curve scan.

According to the maximum input power determining method provided in this embodiment of this application, the maximum input power of the photovoltaic system can be obtained when the system operates at a limited power. This is convenient for subsequent control and power dispatch. Because the partial IV curve scan is performed in the solution provided in this embodiment of this application, a scanning speed can be increased, and the maximum input power can be obtained as soon as possible. In addition, the technical solution provided in this embodiment of this application is to perform the IV curve scan on each DC-DC conversion circuit in the photovoltaic system, thereby avoiding a power estimation error caused by shading or failure of an individual photovoltaic string. With the technical solution provided in this embodiment of this application, the maximum input power of the system can be obtained more accurately.

It should be understood that, in this application, "at least one" means one or more, and "a plurality of" means two or more. The term "and/or" is used to describe an association relationship between associated objects, and indicates that three relationships may exist. For example, "A and/or B" may indicate the following three cases: Only A exists, only B exists, and both A and B exist, where A and B may be singular or plural. The character "/" generally indicates an "or" relationship between the associated objects. "At least one of the following items (pieces)" or a similar expression thereof indicates any combination of these items, including a single item (piece) or any combination of a plurality of items (pieces). For example, at least one (piece) of a, b, or c may represent: a, b, c, "a and b", "a and c", "b and c", or "a, b, and c", where a, b, and c may be singular or plural.

The foregoing embodiments are merely intended to describe the technical solutions of this application, but not to limit this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. A photovoltaic system, comprising: a controller; a Direct Current-Alternating Current (DC-AC) conversion circuit; and a plurality of Direct Current-Direct Current (DC-DC) conversion circuits, wherein: an input end of each of the DC-DC conversion circuits is coupled to connect to a corresponding photovoltaic string, and output ends of the plurality of DC-DC conversion circuits are connected in parallel and coupled to an input end of the DC-AC conversion circuit; and the controller is configured to: perform a partial Current-Voltage (IV) curve scan on each of the DC-DC conversion circuits, and in a process of the partial IV curve scan, control a total input power of the plurality of DC-DC conversion circuits to be consistent with that existing before the partial IV curve scan, to obtain a maximum input power of each of the DC-DC conversion circuits; and obtain a sum of the maximum input powers of all the DC-DC conversion circuits based on the maximum input power of each of the DC-DC conversion circuits, wherein a scanned voltage of the partial IV curve scan is less than an open-circuit voltage; wherein the plurality of DC-DC conversion circuits comprise at least a first DC-DC conversion circuit and a second DC-DC conversion circuit, wherein the input end of the first DC-DC conversion circuit is connected to the corresponding photovoltaic string, the input end of the second DC-DC conversion circuit is connected to the corresponding photovoltaic string, and the output end of the first DC-DC conversion circuit and the output end of the second DC-DC conversion circuit are connected in parallel and connected to the input end of the DC-AC conversion circuit; and the controller is configured to: control an input voltage of the first DC-DC conversion circuit to change, to perform the partial IV curve scan to obtain a first maximum input power of the first DC-DC conversion circuit; in a process of performing the partial IV curve scan on the first DC-DC conversion circuit, adjust an input power of the second DC-DC conversion circuit, so that a sum of an input power of the first DC-DC conversion circuit and the input power of the second DC-DC conversion circuit is consistent with that existing before the partial IV curve scan; by analogy, obtain a second maximum input power of the second DC-DC conversion circuit; and obtain the sum of the maximum input powers of all the DC-DC conversion circuits based on the first maximum input power and the second maximum input power.

2. The system according to claim 1, wherein the controller is configured to: control the input voltage of the first DC-DC conversion circuit to gradually decrease to perform the partial IV curve scan; record the scanned voltage and a scanned current of the first DC-DC conversion circuit in the process of the partial IV curve scan; and stop scanning when the input power of the first DC-DC conversion circuit decreases and the scanned voltage is less than a voltage existing before the partial IV curve scan.

3. The system according to claim 1, wherein the controller is configured to: control the input voltage of the first DC-DC conversion circuit to gradually decrease to perform the partial IV curve scan; record the scanned voltage and a scanned current of the first DC-DC conversion circuit in the process of the partial IV curve scan; and stop scanning when the input power of the first DC-DC conversion circuit is equal to an input power existing before the partial IV curve scan and the scanned voltage is less than a voltage existing before the partial IV curve scan.

4. The system according to claim 2, wherein the controller is configured to obtain the first maximum input power of the first DC-DC conversion circuit based on the scanned voltage and the scanned current.

5. The system according to claim 2, wherein the controller is configured to control the input voltage of the first DC-DC conversion circuit to gradually decrease from a first voltage to perform the partial IV curve scan, wherein the first voltage is an input voltage, of the first DC-DC conversion circuit, corresponding to the maximum input power of the second DC-DC conversion circuit when the total input power of the plurality of DC-DC conversion circuits is consistent with that existing before the partial IV curve scan.

6. The system according to claim 1, wherein the controller is configured to adjust the input power of the second DC-DC conversion circuit in the process of the IV curve scan based on the input power of the first DC-DC conversion circuit, so that the sum of the input power of the first DC-DC conversion circuit and the input power of the second DC-DC conversion circuit is a power limit instruction value of the photovoltaic system.

7. The system according to claim 1, wherein the plurality of DC-DC conversion circuits comprise N circuits in total, and the N DC-DC conversion circuits are divided into at least the following two groups: a first group comprising K circuits and a second group comprising N-K circuits, wherein K is an integer greater than or equal to 2; and the controller is configured to: separately perform the partial IV curve scan on the K DC-DC conversion circuits in the first group; in the process of the partial IV curve scan, control a total input power of the N DC-DC conversion circuits to be consistent with that existing before the partial IV curve scan; obtain the maximum input power of each of the K DC-DC conversion circuits; by analogy, obtain the maximum input power of each of the N-K DC-DC conversion circuits; and obtain the sum of the maximum input powers of the N DC-DC conversion circuits based on the maximum input power of each of the DC-DC conversion circuits.

8. The system according to claim 7, wherein the controller is configured to: control the input voltage of each of the K DC-DC conversion circuits to gradually decrease to perform the partial IV curve scan; record the scanned voltage and a scanned current of each of the K DC-DC conversion circuits; and stop scanning when the input power of each of the K DC-DC conversion circuits decreases and the scanned voltage is less than a voltage existing before the partial IV curve scan.

9. The system according to claim 7, wherein the controller is configured to: control the input voltage of each of the K DC-DC conversion circuits to gradually decrease to perform the partial IV curve scan; record the scanned voltage and a scanned current of each of the K DC-DC conversion circuits; and stop scanning when the input power of each of the K DC-DC conversion circuits is equal to an input power existing before the partial IV curve scan and the scanned voltage is less than a voltage existing before the partial IV curve scan.

10. The system according to claim 7, wherein the controller is configured to obtain the maximum input power of each of the K DC-DC conversion circuits based on the scanned voltage and the scanned current of each of the K DC-DC conversion circuits.

11. The system according to claim 7, wherein the controller is configured to: control the input voltage of each of the K DC-DC conversion circuits to gradually decrease from a second voltage to perform the partial IV curve scan, wherein the second voltage is an input voltage, of each of the K DC-DC conversion circuits, corresponding to a maximum total input power of the N-K DC-DC conversion circuits when the total input power of the plurality of DC-DC conversion circuits is consistent with that existing before the partial IV curve scan.

12. A maximum input power determining method for a photovoltaic system, wherein the photovoltaic system comprises: a Direct Current-Alternating Current (DC-AC) conversion circuit and a plurality of Direct Current-Direct Current (DC-DC) conversion circuits, wherein an input end of each of the DC-DC conversion circuits is configured to connect to a corresponding photovoltaic string, and output ends of the plurality of DC-DC conversion circuits are connected in parallel and connected to an input end of the DC-AC conversion circuit; and the method comprises: performing a partial Current-Voltage (IV) curve scan on each of the DC-DC conversion circuits, and in a process of the partial IV curve scan, controlling a total input power of the plurality of DC-DC conversion circuits to be consistent with that existing before the partial IV curve scan, to obtain 34 a maximum input power of each of the DC-DC conversion circuits; and obtaining a sum of the maximum input powers of all the DC-DC conversion circuits based on the maximum input power of each of the DC-DC conversion circuits, wherein a scanned voltage of the partial IV curve scan is less than an open-circuit voltage; wherein the plurality of DC-DC conversion circuits comprise at least a first DC-DC conversion circuit and a second DC-DC conversion circuit; the performing a partial Current-Voltage (IV) curve scan on each of the DC-DC conversion circuits, and in a process of the partial IV curve scan, controlling a total input power of the plurality of DC-DC conversion circuits to be consistent with that existing before the partial IV curve scan, to obtain a maximum input power of each of the DC-DC conversion circuits comprises: controlling an input voltage of the first DC-DC conversion circuit to change, to perform the partial IV curve scan to obtain a first maximum input power of the first DC-DC conversion circuit, and in a process of performing the IV curve scan on the first DC-DC conversion circuit, adjusting an input power of the second DC-DC conversion circuit, so that a sum of an input power of the first DC-DC conversion circuit and the input power of the second DC-DC conversion circuit is consistent with that existing before the partial IV curve scan; and by analogy, obtaining a second maximum input power of the second DC-DC conversion circuit; and the obtaining a sum of the maximum input powers of all the DC-DC conversion circuits based on the maximum input power of each of the DC-DC conversion circuits comprises: obtaining the sum of the maximum input powers of all the DC-DC conversion circuits based on the first maximum input power and the second maximum input power.

13. The method according to claim 12, wherein the controlling an input voltage of the first DC-DC conversion circuit to change, to perform the partial IV curve scan comprises: controlling the input voltage of the first DC-DC conversion circuit to gradually decrease to perform the partial IV curve scan; recording the scanned voltage and a scanned current of the first DC-DC conversion circuit in the process of the IV curve scan; and stopping scanning when the input power of the first DC-DC conversion circuit decreases and the scanned voltage is less than a voltage existing before the partial IV curve scan.

14. The method according to claim 13, wherein the controlling an input voltage of the first DC-DC conversion circuit to change, to perform the partial IV curve scan comprises: controlling the input voltage of the first DC-DC conversion circuit to gradually decrease to perform the partial IV curve scan; recording the scanned voltage and a scanned current of the first DC-DC conversion circuit in the process of the IV curve scan; and stopping scanning when the input power of the first DC-DC conversion circuit is equal to an input power existing before the partial IV 35 curve scan and the scanned voltage is less than a voltage existing before the partial IV curve scan.

15. The method according to claim 13, wherein the controlling the input voltage of the first DC-DC conversion circuit to gradually decrease to perform the partial IV curve scan comprises: controlling the input voltage of the first DC-DC conversion circuit to gradually decrease from a first voltage to perform the partial IV curve scan, wherein the first voltage is an input voltage, of the first DC-DC conversion circuit, corresponding to the maximum input power of the second DC-DC conversion circuit when the total input power of the plurality of DC-DC conversion circuits is consistent with that existing before the partial IV curve scan.

16. The method according to claim 12, wherein the plurality of DC-DC conversion circuits comprise N circuits in total, and the N DC-DC conversion circuits are divided into at least the following two groups: a first group comprising K circuits and a second group comprising N-K circuits, wherein K is an integer greater than or equal to 2; and the performing a Current-Voltage (IV) curve scan on each of the DC-DC conversion circuits, and in a process of the IV curve scan, controlling a total input power of the plurality of DC-DC conversion circuits to be consistent with that existing before the partial IV curve scan, to obtain a maximum input power of each of the DC-DC conversion circuits comprises: separately performing the partial IV curve scan on the K DC-DC conversion circuits in the first group; in the process of the partial IV curve scan, controlling a total input power of the N DC-DC conversion circuits to be consistent with that existing before the partial IV curve scan; obtaining the maximum input power of each of the K DC-DC conversion circuits; and by analogy, obtaining the maximum input power of each of the N-K DC-DC conversion circuits.

17. The method according to claim 16, wherein the separately performing the partial IV curve scan on the K DC-DC conversion circuits in the first group comprises: controlling the input voltage of each of the K DC-DC conversion circuits to gradually decrease to perform the partial IV curve scan; recording the scanned voltage and a scanned current of each of the K DC-DC conversion circuits; and stopping scanning when the input power of each of the K DC-DC conversion circuits decreases and the scanned voltage is less than a voltage existing before the partial IV curve scan; or controlling the input voltage of each of the K DC-DC conversion circuits to gradually decrease to perform the partial IV curve scan; recording the scanned voltage and a scanned current of each of the K DC-DC conversion circuits; and stopping scanning when the input power of each of the K DC-DC conversion circuits is equal to an input power existing before the partial IV curve scan and the scanned voltage is less than a voltage existing before the partial IV curve scan.

18. The method according to claim 17, wherein the controlling the input voltage of each of the 36 K DC-DC conversion circuits to gradually decrease to perform the partial IV curve scan comprises: controlling the input voltage of each of the K DC-DC conversion circuits to gradually decrease from a second voltage to perform the IV curve scan, wherein the second voltage is an input voltage, of each of the K DC-DC conversion circuits, corresponding to a maximum input power of the N-K DC-DC conversion circuits when the total input power of the plurality of DC-DC conversion circuits is consistent with that existing before the partial IV curve scan.

\* \* \* \* \*